United States Patent
Kumar et al.

(10) Patent No.: US 11,650,751 B2
(45) Date of Patent: May 16, 2023

(54) ADIABATIC ANNEALING SCHEME AND SYSTEM FOR EDGE COMPUTING

(71) Applicant: HEWLETT PACKARD ENTERPRISE DEVELOPMENT LP, Houston, TX (US)

(72) Inventors: Suhas Kumar, Palo Alto, CA (US); Thomas Van Vaerenbergh, Palo Alto, CA (US); John Paul Strachan, San Carlos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 898 days.

(21) Appl. No.: 16/368,981

(22) Filed: Mar. 29, 2019

(65) Prior Publication Data

US 2020/0192598 A1    Jun. 18, 2020

Related U.S. Application Data

(60) Provisional application No. 62/781,596, filed on Dec. 18, 2018.

(51) Int. Cl.
| | | |
|---|---|---|
| *G06F 17/11* | (2006.01) | |
| *G06N 10/00* | (2022.01) | |
| *G06F 3/06*  | (2006.01) | |

(52) U.S. Cl.
CPC .......... *G06F 3/0655* (2013.01); *G06F 3/0604* (2013.01); *G06F 3/0679* (2013.01); *G06F 17/11* (2013.01); *G06N 10/00* (2019.01)

(58) Field of Classification Search
CPC .... G06F 3/0655; G06F 3/0604; G06F 3/0679; G06F 17/11; G06F 17/10; G06F 17/00;
(Continued)

(56) References Cited

U.S. PATENT DOCUMENTS

| | | |
|---|---|---|
| 5,812,992 A | 9/1998 | de Vries |
| 7,135,701 B2 | 11/2006 | Amin et al. |

(Continued)

FOREIGN PATENT DOCUMENTS

| | | |
|---|---|---|
| CN | 107239824 A | 10/2017 |
| WO | WO-2015060915 A2 | 4/2015 |

OTHER PUBLICATIONS

Liu et al. "A Memristor Crossbar Based Computing Engine Optimized for High Speed and Accuracy", 2016, IEEE Computer Society Annual Symposium on VLSI, pp. 110-115. (Year: 2016).*

(Continued)

*Primary Examiner* — Mohamed Charioui
(74) *Attorney, Agent, or Firm* — Sheppard Mullin Richter & Hampton LLP

(57) ABSTRACT

A method for determining a solution to a constrained optimization problem includes programming a weights matrix of a Hopfield network with a first encoded matrix representation of an initial constrained optimization problem. The method also includes employing the Hopfield network to determine a solution to the initial constrained optimization problem. Additionally, the method includes encoding a plurality of constrained optimization problems associated with a target constrained optimization problem into a plurality of encoded matrix representations each of which are a combination of the first and the second encoded matrix representations. The plurality of encoded matrix representations increases in convergence to the second encoded matrix representation of the target constrained optimization problem sequentially. The method further includes re-programming the weights matrix of the Hopfield network in an iterative manner with the plurality of encoded matrix representations.

20 Claims, 23 Drawing Sheets

(58) Field of Classification Search
CPC ............. G06F 12/0207; G06F 12/0238; G06F 2212/1016; G06N 10/00; G06N 3/0445; G06N 3/0635; G06N 5/003; G06N 3/063
See application file for complete search history.

(56) References Cited

U.S. PATENT DOCUMENTS

| | | | |
|---|---|---|---|
| 7,877,333 B2* | 1/2011 | Macready | G06N 7/08 706/52 |
| 7,895,142 B2* | 2/2011 | Neigovzen | G06V 10/75 706/45 |
| 8,229,863 B2 | 7/2012 | Amin et al. | |
| 8,700,552 B2 | 4/2014 | Yu et al. | |
| 9,218,567 B2 | 12/2015 | Macready et al. | |
| 9,727,527 B2 | 8/2017 | Maassen et al. | |
| 2007/0179919 A1 | 8/2007 | Kropaczek et al. | |
| 2008/0065573 A1 | 3/2008 | Macready | |
| 2008/0270331 A1 | 10/2008 | Taylor et al. | |
| 2008/0313430 A1 | 12/2008 | Bunyk | |
| 2013/0124265 A1 | 5/2013 | Whitehair et al. | |
| 2013/0144925 A1 | 6/2013 | Macready et al. | |
| 2014/0136583 A1* | 5/2014 | Hyde | G06F 7/588 708/250 |
| 2014/0214387 A1 | 7/2014 | Tilke | |
| 2015/0262074 A1 | 9/2015 | Bruestle et al. | |
| 2016/0217367 A1 | 7/2016 | Moreno et al. | |
| 2017/0357539 A1 | 12/2017 | Dadashikelayeh et al. | |
| 2018/0197102 A1 | 7/2018 | Mohseni et al. | |
| 2018/0239928 A1 | 8/2018 | Kurian | |

OTHER PUBLICATIONS

Hu et al. "Memristor Crossbar-Based Neuromorphic Computing System: A Case Study", Oct. 10, 2014, IEE transactions on neural networks and learning systems, vol. 25, pp. 1864-1878 (Year: 2014).*

Dong Yu et al., "Exploiting Sparseness in Deep Neural Networks for Large Vocabulary Speech Recognition," ICASSP, 2012, pp. 4409-4412, IEEE.

Ehsan Zahedinejad and Arman Zaribaflyan, "Combinatorial Optimization on Gate Model Quantum Computers: a Survey," Aug. 16, 2017, pp. 1-19.

Jeya Balaji Balasubramanian et al., "Online Article Ranking as a Constrained, Dynamic, Multi-objective Optimization Problem," Proceedings of the Thirtieth International Florida Artificial Intelligence Research Society Conference, Apr. 21, 2017, pp. 32-37.

John Russell, "Quantum Bits: D-Wave and VW; Google Quantum Lab; IBM Expands Access," Mar. 21, 2017, pp. 1-15 (online), HPC Wire, Retrieved from the Internet on Aug. 29, 2018 at URL: <hpcwire.com/2017/03/21/quantum-bits-d-wave-vw-google-quantum-lab-ibm-expands-access/>.

Kalyanmoy Deb et al., "Dynamic Multi-objective Optimization and Decision-making Using Modified NSGA-ii: a Case Study on Hydro-thermal Power Scheduling," May 2007, pp. 1-16.

M. Gethsiyal Augasta and T. Kathirvalavakumar, "Pruning Algorithms of Neural Networks—A Comparative Study," 2003, pp. 1-11 (online), Retrieved from the Internet on Aug. 29, 2018 at URL: <degruyter.com/downloadpdf/j/comp.2013.3.issue-3/s13537-013-0109-x/s13537-013-0109-x.pdf>.

Pedro Bruel et al., "Generalize or Die: Operating Systems Support for Memristor-based Accelerators," Nov. 2017, pp. 1-8, IEEE.

Pooya Ronagh et al., "Solving Constrained Quadratic Binary Problems via Quantum Adiabatic Evolution," Feb. 9, 2018, pp. 1-22.

Seung Woo Shin, "Classical Approaches to Understanding Quantum Systems," Technical Report No. UCB/EECS-2016-191, Dec. 1, 2006, pp. 1-115, University of California at Berkeley, USA.

Sijia Liu et al., "A Memristor-based Optimization Framework for AI Applications," Oct. 2017, pp. 1-28.

Thibaud Ecarot, "Efficient Allocation for Distributed and Connected Cloud," Sep. 29, 2016, pp. 1-166.

Xuhao Chen, "Escort: Efficient Sparse Convolutional Neural Networks on GPUs", Feb. 28, 2018, pp. 1-10.

* cited by examiner

ADIABATIC ANNEALING SCHEME AND SYSTEM FOR EDGE COMPUTING

CROSS-REFERENCE TO RELATED APPLICATION

This application claims the benefit under 35 U.S.C. 119(e) of U.S. Provisional Application No. 62/781,596 filed Dec. 18, 2018.

BACKGROUND

Quantum computing has been explored as a means to solve complex problems. Quantum adiabatic annealing, in particular, has been implemented in Dot-product engine accelerators fabricated with nanoscale memristor crossbar arrays to solve vector-matrix multiplication, generally regarded as a computationally expensive task. By applying a vector of voltage signals to the rows of a memristor crossbar array, vector multiplication can be readily accomplished. As such, the application of memristor crossbar arrays for quantum computing has great potential for next-generation memory and switching devices.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
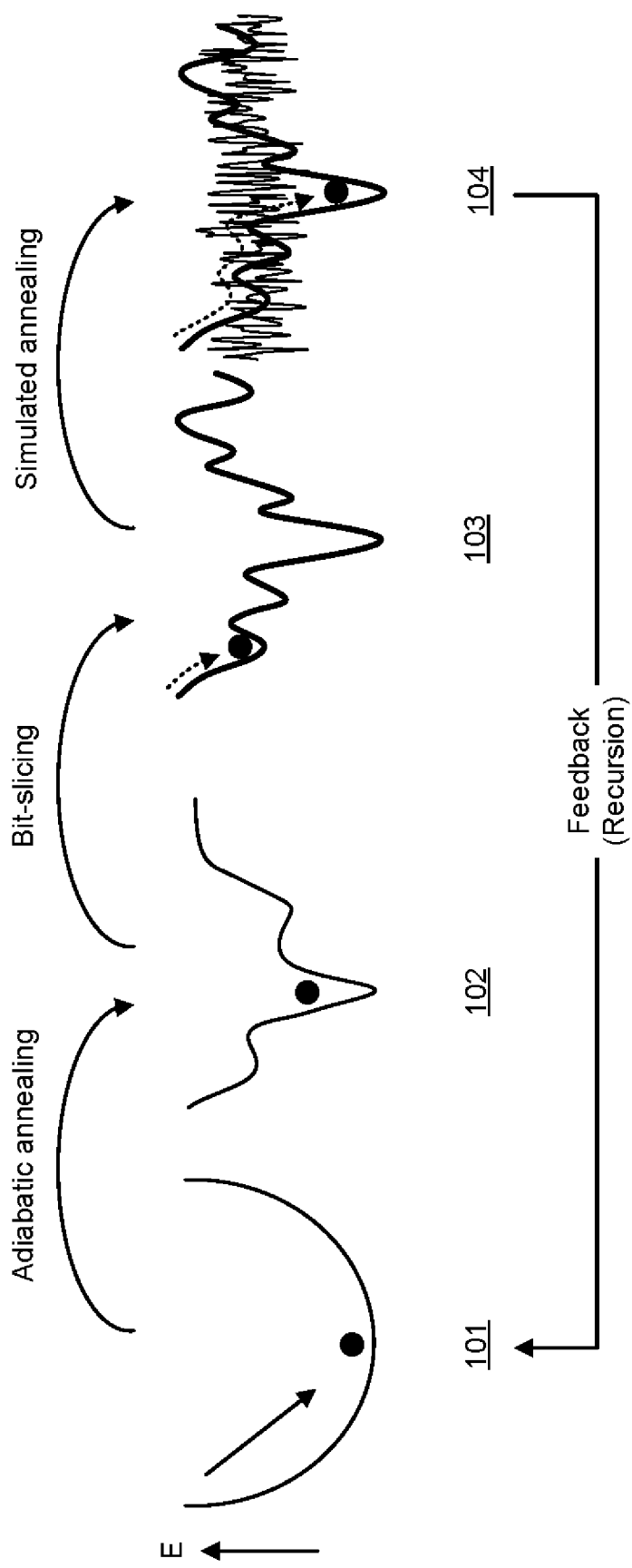
FIG. 1 is an illustration of techniques which may be employed to solve a constrained optimization problem with a dot-product engine architecture implementing a Hopfield network, according to one or more implementations of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

Quantum adiabatic annealing is a form of quantum computing that has been implemented to solve constrained optimization problems. In some implementations, adiabatic annealing applies the adiabatic theorem which states that, if changed slowly enough, a system, if started in the ground state (e.g., optimal lowest energy mode), remains in the ground state for the final Hamiltonian function (e.g., Hamiltonian).

Herein, constrained optimization problems are defined as a class of problems which arises from applications in which there are explicit variable constraints. Constrained optimization problems can be classified according to the nature of the constraints (e.g., linear, nonlinear, convex) and the smoothness of their functions (e.g., differentiable or non-differentiable).

Previous implementations to solve constrained optimization problems have been attempted with traditional electrical networks and GPU-based matrix multiplication systems. Although progress has been made with implementing the use of adiabatic annealing within commercial contexts, adiabatic annealing has been prohibitively expensive to achieve low temperatures for generating solutions for constrained optimization problems. For instance, when quantum adiabatic annealing is implemented within a physical device, temperature and other noise effects play an important role and therefore thermal excitation and energy relaxation cannot be neglected as they can affect performance.

A Dot-product engine (DPE) is a high density, high-power-efficiency accelerator which can perform matrix-vector multiplication tasks associated with neural network applications. In some implementations, a DPE offloads certain multiplication elements common in neural network interfaces. Examples of the present disclosure employ a Hopfield network system to determine a solution for a simple constrained optimization problem and then implements adiabatic annealing to determine a solution for a more complex problem. Examples of the present disclosure employ a DPE implemented as a weights matrix which can be iteratively re-programmed during a converging process to achieve solutions to a constrained optimization problem at optimal lowest energy states. Examples of the present disclosure incorporate simulated annealing to add chaos to a system during an adiabatic annealing process to further increase performance.

In some examples, a known simple problem's energy landscape may include only a single global minimum and may be represented by a Hamiltonian which is encoded onto the conductances of a memristor DPE crossbar network using a weights programming unit, as will be described in more detail below. The Hopfield system may utilize gradient descent to converge to a minimum of an energy landscape which may translate to a solution of a known simple problem.

A Hopfield network may be employed as a dynamic system which can be expressed by a Lyapunov function E (i.e., a Hopfield energy function):

$$E = -(0.5)\Sigma_i \Sigma_{i \neq j} s_i s_j w_{ij} - \Sigma_i s_i I_i \quad \text{(Equation 1)}$$

In some implementations, the weights matrixes of the Hopfield network systems disclosed herein are symmetric (i.e., $w_{ij} = w_{ji}$), and asynchronously updated such that the Lyapunov function converges to a local minimum. In one implementation, a Hopfield network system converges to a local minimum when it converges to a set of states that represent a local minimum of an energy function.

Advantageously, a Hopfield network system can be used to identify and match stored information or solve constrained optimization problems. In some implementations, a Hopfield network system can effectively transform a constrained optimization problem into an unconstrained problem by aggregating objectives and constraints into a single energy function to take the form of an objective that needs to be minimized.

Herein, an objective associated with a target constrained optimization problem may be defined as a specific result that a system seeks to achieve within a specified time frame. Constraints associated with a target constrained optimization problem may be defined as the resources available to achieve the stated objective. In one implementation of the present disclosure, the solutions determined by the Hopfield network system may satisfy some but not all of the objectives or constraints.

The present disclosure may be applied to a non-deterministic polynomial-time hard (NP-hard) class of decision problems that generally consume an exponentially increasing computation time when the solutions to these problems are generated by, for example, digital computers. NP-hard problems may include, but are not limited to, vehicle route scheduling, traveling salesman problems, satellite resource sharing, bandwidth allocation, etc.

Turning to the drawings, FIG. 1 is an illustration of techniques employed to solve a constrained optimization problem with a DPE architecture implementing a Hopfield network, according to one or more implementations of the present disclosure. Energy function 101 may be associated with a simple problem with a known solution as depicted by the relatively smooth function curve with a single global minimum. The present disclosure may employ adiabatic annealing by implementing a Hopfield network to determine a solution to a target constrained optimization problem by introducing Hamiltonian matrices associated with a simple problem and a target constrained optimization problem in a weighted, gradual manner. For example, transitioning from energy function 101 to energy function 102 may result from implementing adiabatic annealing during a Hopfield network process.

Furthermore, the present disclosure may employ bit-slicing to improve a Hopfield network's ability to converge onto optimal solutions to a target constrained optimization problem. Herein, bit-slicing may refer to a technique that divides an encoded Hamiltonian matrix associated with a target constrained optimization problem into a set of least significant bits, lesser significant bits, and most significant bit matrices. For example, transitioning from energy function 102 to energy function 103 may result from implementing bit slicing.

Simulated annealing may also be employed to improve a Hopfield network's ability to converge onto optimal solutions for target constrained optimization problems. Simulated annealing may include the interjection of stochastic noise or chaos into the Hopfield network to move the energy of the state of the network from a local minima to a global minimum such that more accurate solutions can be obtained for target constrained optimization problems. For example, energy function 104 may represent the injection of stochastic noise to "dial-in" the solution to that associated with a lowest energy minimum.

Figure 2:
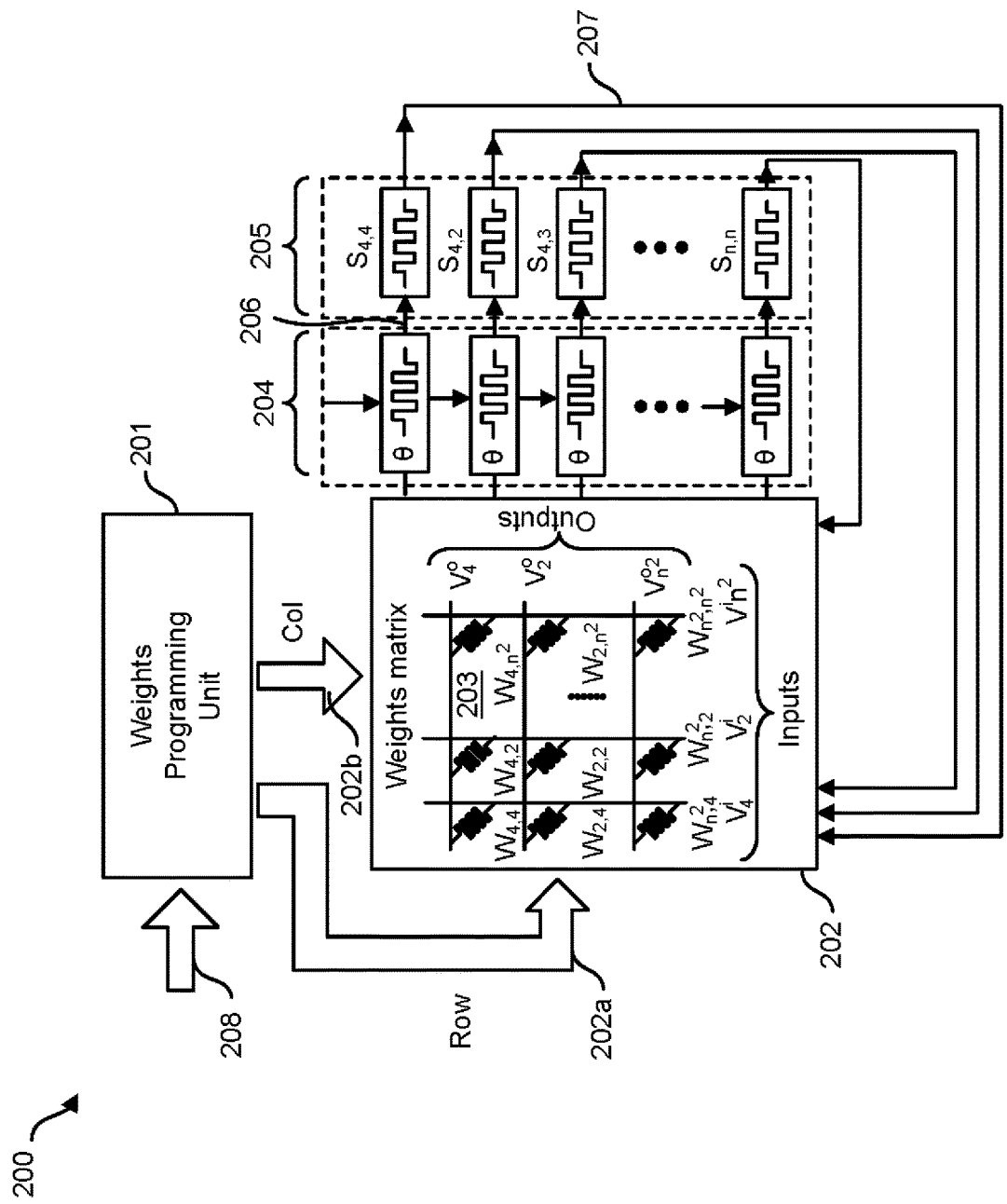
FIG. 2 is an illustration of a Hopfield network system which implements a weights programming unit, according to one or more implementations of the present disclosure.

FIG. 2 is an illustration of a Hopfield network system 200 which implements a weights programming unit 201, according to one or more implementations of the present disclosure. Hopfield network system 200 may be incorporated into various types of hardware accelerator devices such as, but not limited to, an application-specific integrated circuit (ASIC) accelerator.

As will be described in more detail below, the weights programming unit 201 can program a plurality of encoded matrix representations 208 of constrained optimization problems into a weights matrix 202 of the Hopfield network system 200 in an iterative manner. In some implementations, the Hopfield network system 200 converts all constraints to objectives during the encoding of a target constrained optimization problem.

As shown in FIG. 2, Hopfield network system 200 includes the weights matrix 202, a filtering unit 204, and a solutions memory 205. The Hopfield network system 200 can be employed to find the ground state which corresponds to a best solution to a target constrained optimization problem.

In some implementations, the weights programming unit 201 may be a digital computer. However, the present disclosure is not limited thereto. The weights programming unit 201 can program and re-program, in an iterative manner, Hamiltonians into the weights matrix 202. Herein, a Hamiltonian is a mathematical function which expresses the rate of change in time of the condition of a dynamic physical system—one regarded as a set of moving particles. The Hamiltonian of a system specifies its total energy, particularly the sum of a system's kinetic energy with respect to its motion and its potential energy.

In some implementations, the weights programming unit 201 further generates the Hamiltonians or any encoded matrix representations that are to be programmed into the weights matrix 202. However, in other implementations, the Hamiltonians are generated by a system that is external to the Hopfield network system 200. For example, the plurality of encoded matrix representations 208 may increase in convergence to the encoded matrix representation of the target constrained optimization problem sequentially.

For example, the set of Hamiltonians may increase in convergence sequentially to the Hamiltonian associated with the target constrained optimization problem. In addition, the Hamiltonian associated with a simple problem with a known solution may be first programmed onto the Hopfield network and subsequently each Hamiltonian of the set of Hamiltonians related to the target constrained optimization problem may be programmed onto the Hopfield network such that solutions are obtained for each problem represented by the encoded Hamiltonians programmed on the Hopfield network. In some implementations, the Hopfield network system 200 may be analog in nature although the weights programming unit 201 may include digital components.

In some implementations, the weights programming unit 401 includes a digital-to-analog converter (DAC) (not shown). The DAC can convert the digital Hamiltonians or other matrix representations into analog signals which may be programmed into the weights matrix 202 by the weights programming unit 201.

The weights matrix 202 may generate a solution to the stored encoded matrix representations of constrained optimization problems programmed therein by the weights programming unit 201. In one implementation, the weights matrix 202 includes a memristor crossbar array. A memristor crossbar array may include a plurality of non-volatile memory elements each of which includes a two-terminal memory element that stores an encoded matrix representation of a constrained optimization problem.

Herein, a memristor is defined as a non-volatile electrical component that limits or regulates the flow of electrical current in a circuit and remembers the amount of charge that has previously flowed therethrough. Memristors may include passive circuit elements which maintain a relationship between the time integrals of current and voltage across a two-terminal device.

Further, a memristor crossbar array may be defined as a crossbar array structure which includes a grid of two sets of parallel nanowires that includes a memristor switch at each cross-point between the horizontal and vertical wires. Memristor crossbar arrays may offer complementary metal-oxide-semiconductor (CMOS) process compatibility, high density, and the ability to perform many computations in a relatively short period of time.

In some implementations, matrix-multiplication-performed weighted feedback can be implemented in a DPE which includes a network of two-terminal non-volatile memristor elements of the weights matrix. The resistances of the memristor elements can be tuned to multiple values representing the weights that scale the input current/voltage. Advantageously, the DPE employs a set of non-volatile analog memristors to perform vector multiplications and additions with minimum latency and power expenditures (e.g., less than $10^{13}$ operations/s/W). The thresholding function of the filtering unit 204 may consume less than 100 fJ/operation and the storage of binary states in the solutions memory 205 can consume less than 200 fJ/bit/$\mu m^2$ in some implementations of the present disclosure.

The memristor crossbar array of the weights matrix 202 can be fabricated from a tantalum oxide (TaO) material. The memristor crossbar array of the filtering unit 204 can also be employed as a nanoscale Mott memristor.

Weights matrix 202 has a plurality of cells 203 (one indicated) which can retain the vector values associated with the encoded matrix representations of the constrained optimization problems, according to the implementation shown.

The weights matrix 202 may include rows 202a and columns 202b to identify each cell 203 of the weights matrix 202. In one implementation, the cells retain values associated with a Hamiltonian function.

Filtering unit 204 can filter the solutions generated by the weights matrix 202. In some implementations, the filtering unit 204 includes an array of filtering devices. The filtering unit 204 can execute an algorithm to filter the generated solutions known in the art. The filtering unit 204 may include threshold switching devices, nonlinear resistors, or other electronic components which include a nonlinear transfer function. In some implementations, the filtering unit includes a set of threshold switching components fabricated from a NbO (or $NbO_2$) material.

The solutions memory 205 can receive convergence solutions (e.g., $S_{n,n}$) to a constrained optimization problem filtered by the filtering unit 204. In one or more implementations, the solutions memory 205 includes an array of non-volatile storage elements that receives (e.g., via transmission lines 206) the convergence solutions from the filtering unit 204. The non-volatile storage elements of the solutions memory 205 may include non-linear resistors, memristors, phase change memory, or spin torque-transfer random access memory (RAM). In some implementations, the non-volatile storage elements of the solutions memory 205 are fabricated from a tantalum oxide (TaO) material.

Before the convergence solutions are stored in the solutions memory 205, the solutions are compared with the convergence solutions presently stored in the solutions memory 205. If the convergence solution that was previously filtered by the filtering unit 204 is different than the convergence solution presently stored in the solutions memory 205, the solutions memory 205 is overwritten with the new intermediate convergence solution. In addition, the new convergence solution is sent to the weights matrix 202 via transmission lines 207.

In some implementations, the weights programming unit 201 also includes an analog-to-digital converter (ADC) (not shown). Once a convergence solution is determined by the Hopfield network system 200 according to a process described herein, the weights programming unit 201 can receive analog signals corresponding to the generated solution of a constrained optimization problem, convert the analog signals to digital signals, and output the digital signals to a graphical user interface (GUI) (not shown).

Weights programming unit 201 can program or re-program the weights matrix 202 in several ways. In one implementation, the weights programming unit 201 programs/re-programs the weights matrix 202 by applying electrical signals thereto. For example, the weights matrix 202 can be programmed/re-programmed with a single set of voltage pulses according to one or more implementations of the present disclosure.

Figure 3:
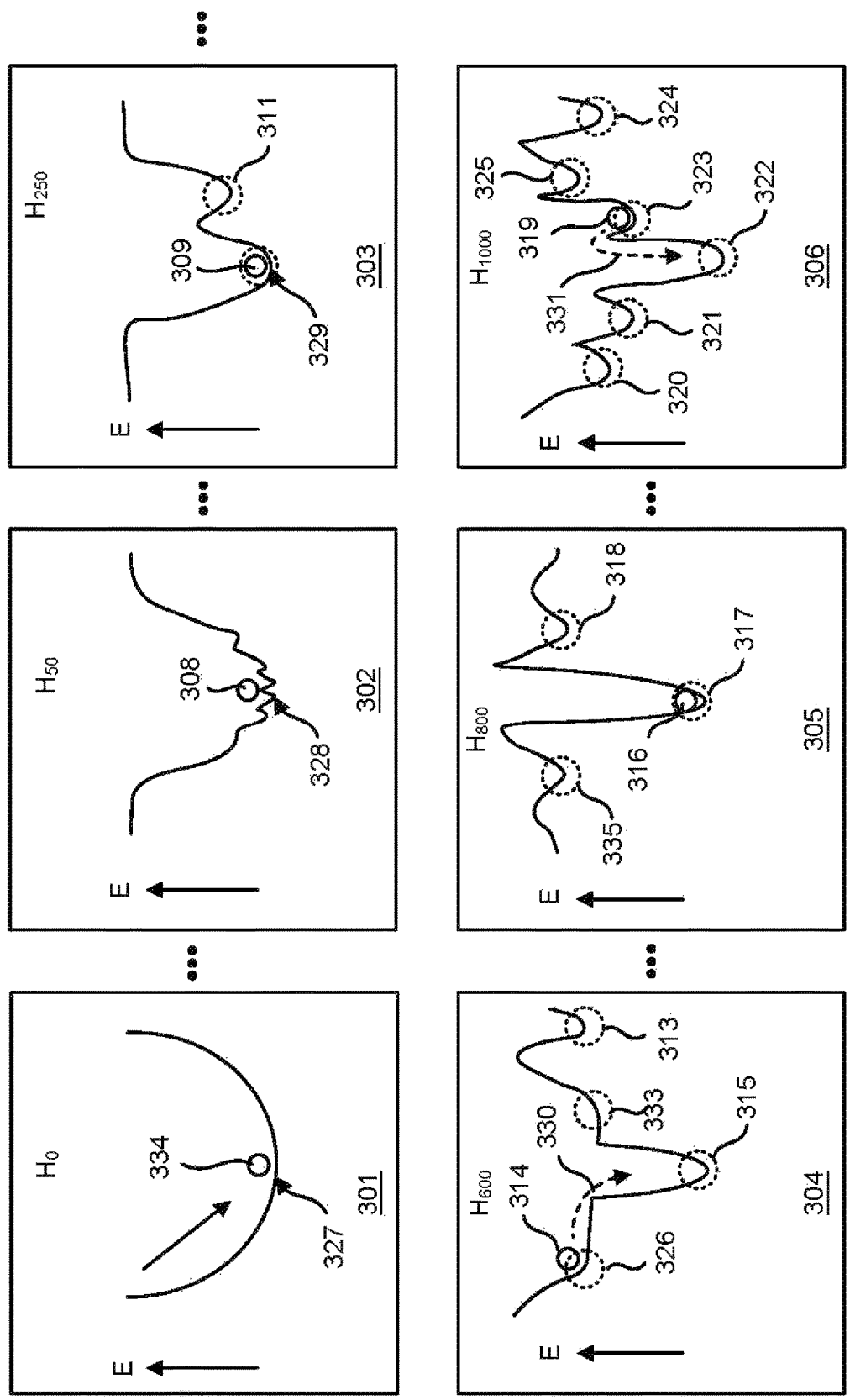
FIG. 3 is an illustration of several energy functions associated with a constrained optimization problem, according to one or more implementations of the present disclosure.

FIG. 3 is an illustration of several Hopfield energy functions associated with a target constrained optimization problem, according to one or more implementations of the present disclosure. As will be described in more detail below, the Hamiltonians associated with a target constrained optimization problem in addition to a Hamiltonian associated with a simple known problem can be used to obtain convergence solutions for the targeted constrained optimization problem.

In some implementations, energy function 301 may be associated with a single constrained optimization problem with a widely known or easily achievable solution associated with an optimal lowest energy stage. Energy function 301 may also be associated with an initial Hamiltonian ($H_0$).

Energy function 301 depicts a simple parabolic curve with a global minimum 327 as shown by the presence of energy particle 334 at the optimal lowest energy state. In some implementations, the initial constrained optimization problem associated with energy function 301 may not be associated with the target constrained optimization problem, unlike the constrained optimization problems associated with energy functions 302-305, as will be described below.

In some implementations, the initial constrained optimization problem associated with energy function 301 may be encoded as a plurality of matrix representations and then programmed into the weights matrix (e.g., weights matrix 202 of FIG. 2) of the Hopfield network system (e.g., Hopfield network system 200 of FIG. 2) via the weights programming unit 401. The Hopfield network system 200 can be used to determine an optimal solution to the constrained optimization problem associated with the energy function 301 (FIG. 3).

FIG. 3 depicts several energy functions 302-305 which are related to the energy function 306 associated with the target constrained optimization problem to be solved by a Hopfield network system described herein. In some implementations, the Hamiltonians associated with energy functions 302-305 are fractions of the Hamiltonian associated with energy function 306.

In some implementations, energy function 301 is associated with a Hamiltonian function ($H_0$) that may not be related to the Hamiltonian function ($H_T$) associated with a target constrained optimization problem. However, in other implementations, the energy function 301 associated with a Hamiltonlan is related to or is a simplified version of the Hamiltonian ($H_T$) associated with the target constrained optimization problem.

Energy function 306 is associated with a target constrained optimization problem. Notably, energy function 306 has five local minima 320, 321, 323-325 and one global minimum 322. One having ordinary skill in the art should appreciate that complex constrained optimization problems are typically associated with energy functions which have several local minima.

Moreover, as a constrained optimization problem increases in complexity, the energy functions associated therewith may generally exhibit more local minima. For instance, the greater the Hamiltonian number ($H_x$), the greater the number of local minima that may be exhibited in the associated energy function. For example, an energy function associated with the 500$^{th}$ Hamiltonian ($H_{500}$) may exhibit more local minima than an energy function associated with the 100$^{th}$ Hamiltonian ($H_{100}$). Likewise, the less complex the constrained optimization problem, the fewer number of local minima that may be exhibited in the associated energy function.

Furthermore, simulated annealing may be implemented by adding chaos (e.g., or stochastic noise) into a Hopfield network system. Herein, simulated annealing is defined as a probabilistic technique for aiding in the search for the global optimum of a given function. In addition, simulated annealing may also be a metaheuristic to approximate global optimization in a large search space for a target constrained optimization problem. In some implementations, $NbO_2$ filtering unit devices can effectively enable simulated annealing through highly sensitive voltage-tunable chaotic behavior.

Herein, chaos is defined as any noise or interference which can be defined as undesirable electrical signals which distort or interfere with an original signal. In some implementations, injecting noise into a Hopfield network system may include injecting fluctuations, perturbations, stochasticity, or any such electrical signal that is utilized for gradient descent to aid in the convergence of the Hopfield network system to reach a global minimum. Moreover, in some implementations, injecting a relatively large degree of stochastic noise or chaos into a Hopfield network system during a convergence process can achieve solutions at a faster rate than when injecting a relatively smaller degree of stochastic noise or chaos during the convergence process.

Inducing stochastic noise or chaos can be used to help settle an energy particle into a global minimum. For example, injecting stochastic noise or chaos may be accomplished by implementing a voltage-tunable stochastic noise or chaos process. Simply put, stochastic noise or chaos can be injected into a filtering unit of the Hopfield network system to displace the system from a local minimum to a global minimum. The level of stochastic noise or chaos injected into a Hopfield network system, such as the Hopfield network system 200 (shown in FIG. 2) may range from about 50 µA to about 150 µA and may last from about 5 µs to about 50 µs.

In some implementations, energy functions 302-305 represent constrained optimization problems that are associated with, but are simplified variants of, a target constrained optimization problem. In some implementations, a Hamiltonian associated with a target constrained optimization problem, is "simplified" into a number of related Hamiltonians. For example, a target constrained optimization problem may be associated with 100, 500, 1,000, 10,000, etc. Hamiltonians. In some implementations, the Hopfield network system can determine a solution for each programmed Hamiltonian within a few microseconds.

In the example depicted in FIG. 3, 1,000 Hamiltonians are generated and programmed into a weights matrix 202 of a Hopfield network system 200 (FIG. 2), iteratively, such that adiabatic annealing can be implemented to determine a solution to a target constrained optimization problem. Advantageously, the present disclosure can implement adiabatic annealing to systematically determine the best solution to a target constrained optimization problem.

In the implementation shown, energy function 302 is the fiftieth Hamiltonian ($H_{50}$) generated to determine a solution to the target constrained optimization problem. Energy function 302 has a single minimum 328 as shown by the presence of energy particle 308 therein. Notably, the energy functions 302-306 are successively complex as they are representations of their associated Hamiltonian functions. In particular, energy function 302 is parabolic in nature whereas energy function 306 is parabolic to a lesser degree. Likewise, the energy function associated with the first Hamiltonian (i.e., $H_1$) may be noticeably more parabolic than the $100^{th}$ Hamiltonian (i.e., $H_{100}$).

Moving forward, energy function 303 is associated with the $250^{th}$ Hamiltonian generated to determine a solution for the target constrained optimization problem. As illustrated, energy function 303 is less parabolic than energy function 302 and notably has a local minimum 311 and a global minimum 329. Energy function 303 illustrates that the energy particle 309 is lodged in global minimum 329.

Furthermore, energy function 304 is the $60^{th}$ ($H_{600}$) Hamiltonian generated to determine a solution to the target constrained optimization problem. As illustrated, energy function 304 has three local minima 313, 326, 333 and a global minimum 315. Various techniques disclosed herein can be employed to move energy particle 309 from local minimum 326 to global minimum 315. In the implementation shown, an energy particle 314 is located at local minimum 326. The present disclosure can also implement simulated annealing to achieve the optimal lowest energy state (e.g., global minimum 312) such that the best solution to the constrained optimization problem can be determined.

FIG. 3 further illustrates an energy function 305. Energy function 305 is the $800^{th}$ ($H_{800}$) Hamiltonian generated to determine a solution to the target constrained optimization problem. Energy function 305 more resembles energy function 306 than energy functions 302-304. Energy function 305 has two local minima 318, 335 and a single global minimum 317. In the implementation shown, energy particle 316 is lodged at the global minimum 317.

Energy function 306 shows that an energy particle 319 is presently lodged in local minimum 323. Notably, a solution associated with a lowest optimal energy state for this Hamiltonian is associated with global minimum 322. However, because local minimum 323 is not the global minimum 322 for energy function 306, the solution(s) corresponding to local minimum 320 would not be the best solutions to the target constrained optimization problem. Similarly, if energy particle 319 moves to local minima 320, 321, 324, or 325, the corresponding solutions would not be the best solutions because they are not the optimal lowest energy states of the energy function 306. In some implementations, simulated annealing may be employed with adiabatic annealing to help a Hopfield network system obtain the lowest energy state (e.g., per Hamiltonian). For example, simulated annealing may be employed to move energy particle 319 from local minimum 323 to global minimum 322 in direction 331.

The encoded matrix representations of the constrained optimization problems may be programmed iteratively into the weights matrix 202 by the weights programming unit 201 (shown in FIG. 2). In some implementations, the energy matrix representations are Hamiltonians which sequentially converge towards the Hamiltonian associated with the target constrained optimization problem. For example, the sequence of programming the weights matrix by the weights programming unit may be represented by the following:

$$H_0 = H_0;$$
$$H_1 = (1 - 1/x) * H_0 + (1/x) * H_T;$$
$$H_2 = (1 - 2/x) * H_0 + (2/x) * H_T;$$
$$...$$
$$...$$
$$...$$
$$H_X = H_T$$

In this implementation, X=total number of steps taken. $H_0$ is the Hamiltonian function of a simple problem, $H_T$ is the Hamiltonian of a target constrained optimization problem, and $H_1$ . . . $H_X$ are the additional Hamiltonians used to program the weights matrix for each subsequent iteration.

At the end of all the iterations, the solution represented by the states may be the optimal solution to a target constrained optimization problem that satisfies all of the constraints and objectives.

Figure 4:
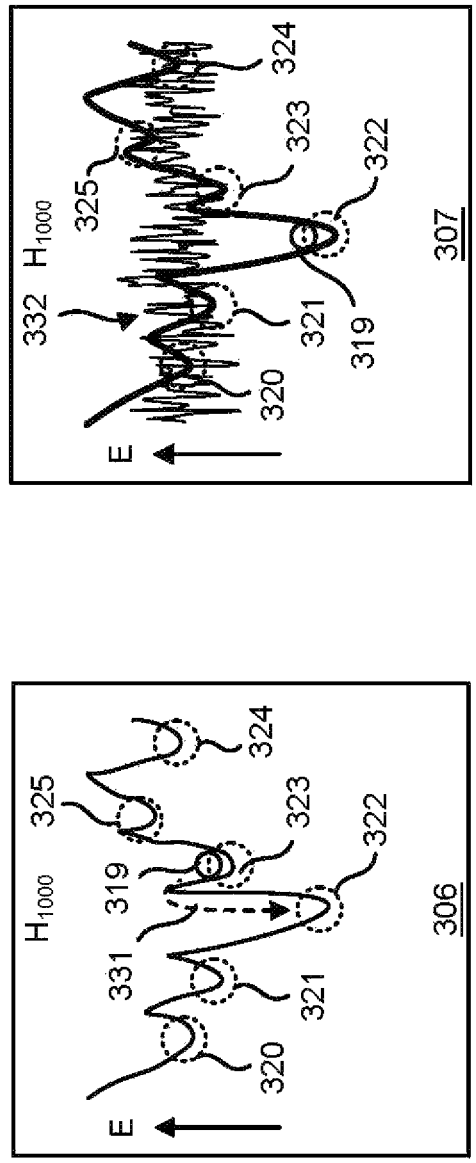
FIG. 4 is an illustration of a manner of implementing simulated annealing, according to one or more implementations of the present disclosure.

FIG. 4 is an illustration of a manner of implementing simulated annealing according to one implementation of the present disclosure. Notably, FIG. 4 depicts energy functions 306, 307 associated with a final Hamiltonian $H_{1000}$. As the present disclosure employs adiabatic annealing to gradually move the system to an optimal lowest energy state, simulated annealing may be further employed to get the system to reach the optimal lowest energy state. As shown, energy function 306 depicts an energy particle that is lodged in a local minimum 323.

Simulated annealing can be used to move the state of network energy particle 319 of a local minimum 323 to global minimum 322 as shown by the direction 330 in energy function 307. Simulated annealing may include injecting stochastic noise 332 as illustrated. It should be understood by one having ordinary skill in the art that a Hopfield network system (e.g., the Hopfield network system 200 of FIG. 2) described herein iterates by programming each generated Hamiltonian into the weights matrix 201 sequentially and also iterates to determine a solution with an optimal lowest energy state. Likewise, it should be understood that the Hopfield network system (e.g., the Hopfield network system 200 of FIG. 2) converges to a solution for each Hamiltonian and also converges to a global solution for the Hamiltonian associated with the target constrained optimization problem.

Figure 5:
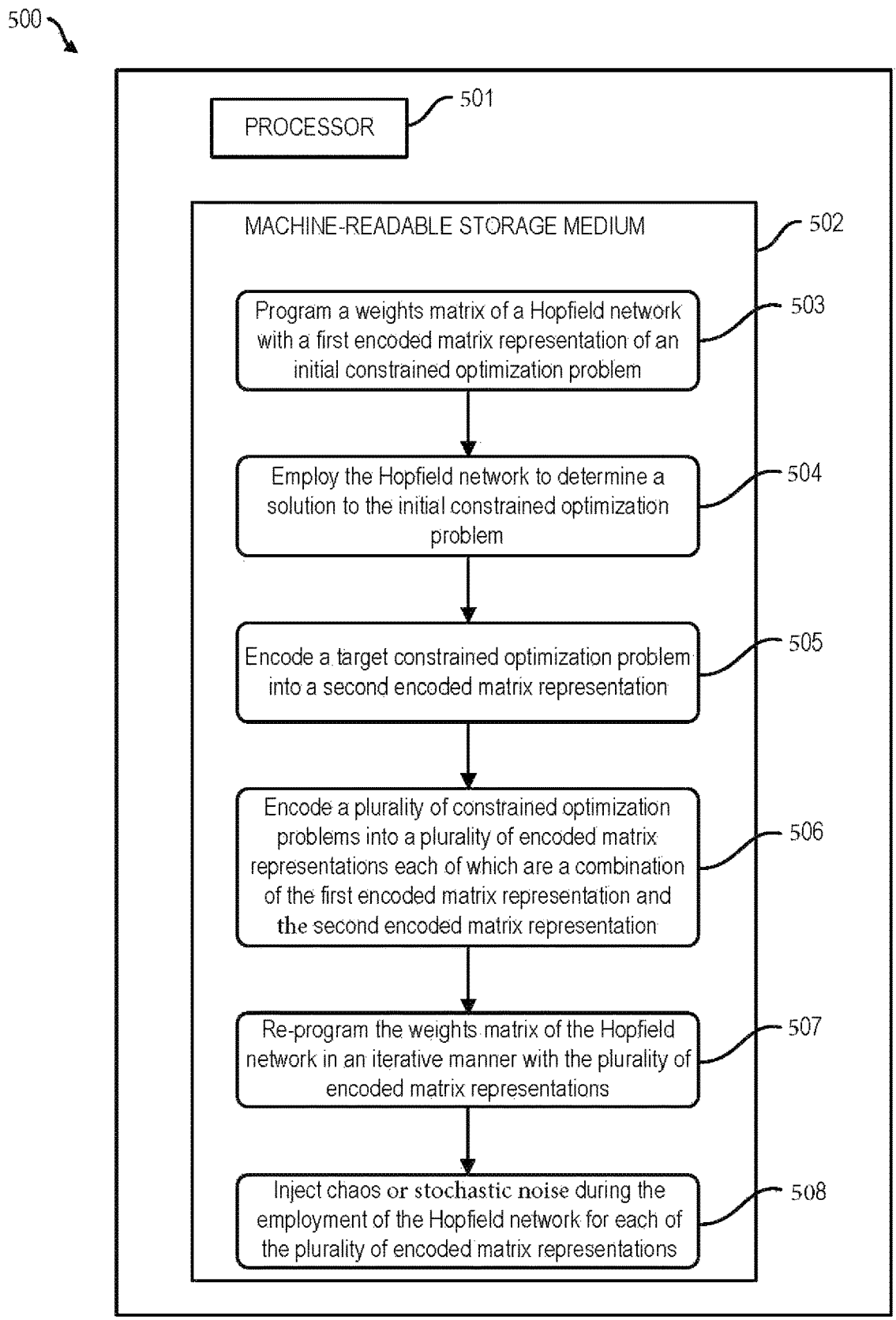
FIG. 5 is an illustration of a computing system, according to one or more examples of the present disclosure.

FIG. 5 is an illustration of a computing system 500, according to one or more examples of the present disclosure. The computing system 500 may include a non-transitory computer readable medium 502 that includes computer executable instructions 203-208 stored thereon that, when executed by one or more processing units 501 (one shown), causes the one or more processing units 501 to determine a solution to a target constrained optimization problem, according to one implementation of the present disclosure.

Computing system 500 may employ a Hopfield network system (e.g., Hopfield network system 200 as illustrated in FIG. 2). Computer executable instructions 203 include programming a weights matrix (e.g., weights matrix 202 of a Hopfield network system 200 of FIG. 2) with a first encoded matrix representation of an initial constrained optimization problem. Next, computer executable instructions 504 includes employing the Hopfield network system to determine a solution to the initial constrained optimization problem. In some implementations, the initial constrained optimization problem is a simple problem with well-defined solutions and may not be related to the target constrained optimization problem.

Computer executable instructions 505 include encoding a target constrained optimization problem into a second encoded matrix representation. In some implementations, the target constrained optimization problem is unrelated to the initial constrained optimization problem. Next, computer executable instructions 506 include encoding a plurality of constrained optimization problems associated with a target constrained optimization problem into a plurality of encoded matrix representations each of which are a combination of the first encoded matrix representation and the second encoded matrix representation associated with the target constrained optimization problem. In some implementations, the plurality of encoded matrix representations may increase in convergence to the second encoded matrix representation sequentially. In addition, the plurality of energy functions associated with the plurality of constrained optimization problems may decrease in convexity successively, according to some implementations.

Further, computer executable instructions 507 includes re-programming the weights matrix in an iterative manner with the plurality of encoded matrix representations (e.g., Hamiltonians). For each programmed Hamiltonian, the Hopfield network system may iterate until it converges to a solution. Re-programming the weights matrix of the Hopfield network system may include re-programming the weights matrix with one of the plurality of encoded matrix representations in a sequential manner. In addition, re-programming the weights matrix may include employing the Hopfield network system to determine a solution to the encoded matrix representation presently programmed in the weights matrix.

Lastly, computer executable instructions 508 include injecting stochastic noise or chaos during the employment of the Hopfield network system for each of the plurality of encoded matrix representations. In some implementations, injecting stochastic noise or chaos during the employment of the Hopfield network system includes injecting a large degree of stochastic noise or chaos followed by injecting smaller degrees of stochastic noise or chaos into the system.

Figure 6:
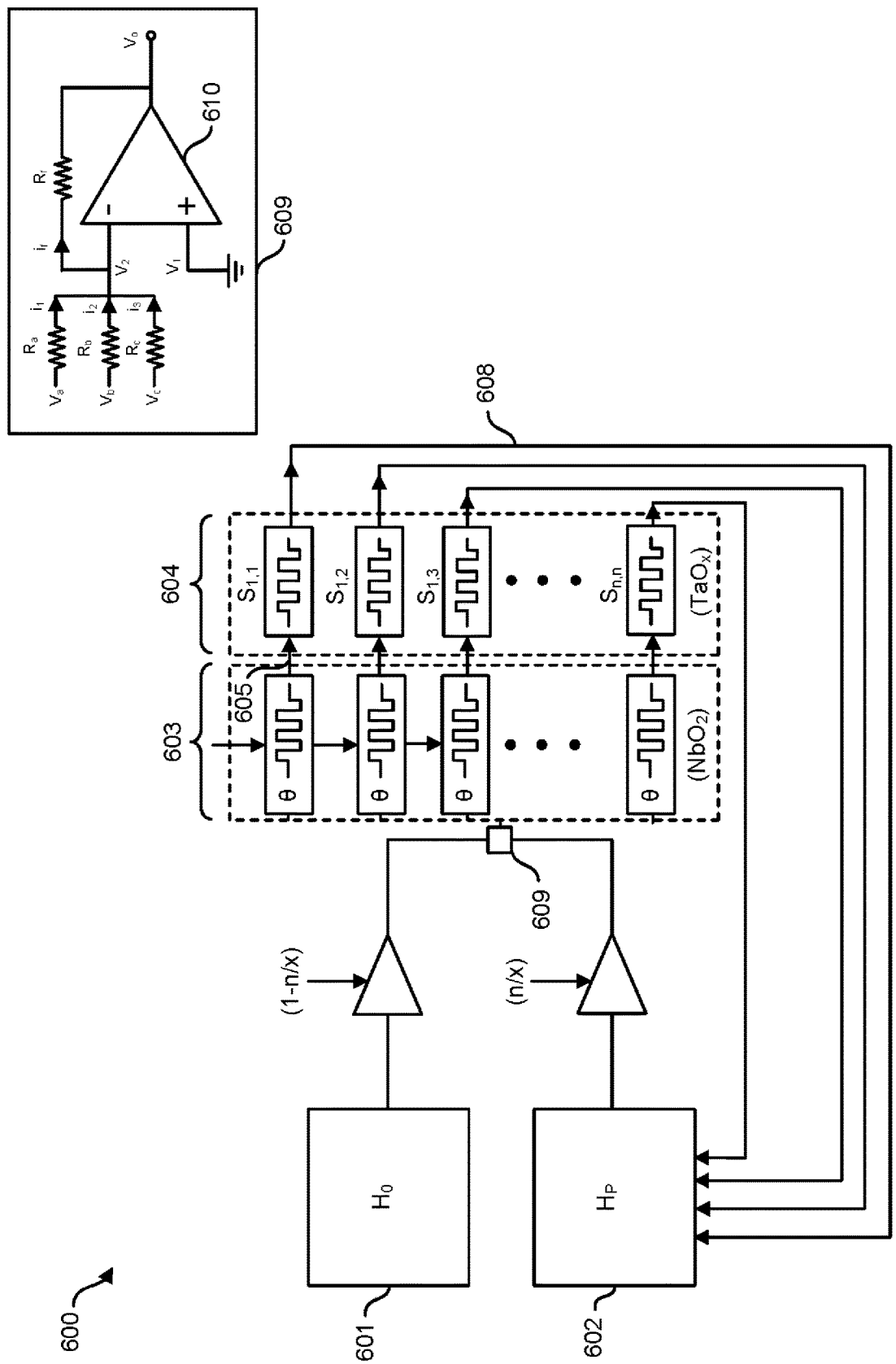
FIG. 6 is an illustration of a Hopfield network system which implements a weighted hybrid matrix representation, according to one or more implementations of the present disclosure.

FIG. 6 is an illustration of a Hopfield network system 600 which implements a weighted hybrid matrix representation, according to one or more implementations of the present disclosure. Hopfield network system 600 includes weights matrices 601, 602. In one implementation, the weights matrix 601 is programmed with a Hamiltonian 603 associated with a simple constrained optimization problem. However, the present disclosure may not be limited to this implementation. For example, the weights matrix 601 may be programmed with a Hamiltonian related to the target constrained optimization problem.

In the implementation shown, the solutions generated for the Hamiltonian functions associated with the weights matrixes 601, 602 are transmitted to weighting component 609. The weighting component 609 generates a weighting sum of the solutions generated by the weights matrixes 601, 602. In some implementations, weighting component 609 includes an operational amplifier 610.

After the weighting component 609 generates a weighted sum of the solutions associated with weights matrices 601, 602, the weighting component 609 transmits (e.g., via transmission lines 605) the weighted solution to the filtering unit 603.

The filtering unit 603 receives the weighted solution and filters the solution. The filtered solution may be saved in the solutions memory 604 after the filtered solutions are compared to the solution presently stored in the solutions memory 604. If the new solution(s) filtered by the filtering unit 603 is determined to be different than the solutions stored in the solutions memory 604, the new solution(s) is stored in the solutions memory 604 and then transmitted (e.g., via transmission lines 608) to the weights matrix 602 where the process continues to iterate until the Hopfield network system 600 converges to a solution for the programmed Hamiltonian. In some implementations, a copy of the new solutions are transmitted to the weights matrix 602.

Although the implementation illustrated in FIG. 6 incorporates two weights matrices 601, 602, the present disclosure is not limited thereto. The present disclosure is amenable such that the Hopfield network system 600 includes greater than two weights matrices 601, 602 each of which may be programmed with a different Hamiltonian. The solutions generated by each weights matrix 601, 602 can be weighed by weighting amplifier 609 and then transmitted to filtering unit 603 for further processing (e.g., filtering). The filtered solution may be employed with a solution presently stored in the solutions memory 604. If the comparison yields a difference, a copy of the filtered solution is stored in the solutions memory 604 and then transmitted to the weights matrix 601, 602 programmed with the Hamiltonian associated with the target constrained optimization problem for further processing to converge the most optimal solution.

Figure 7:
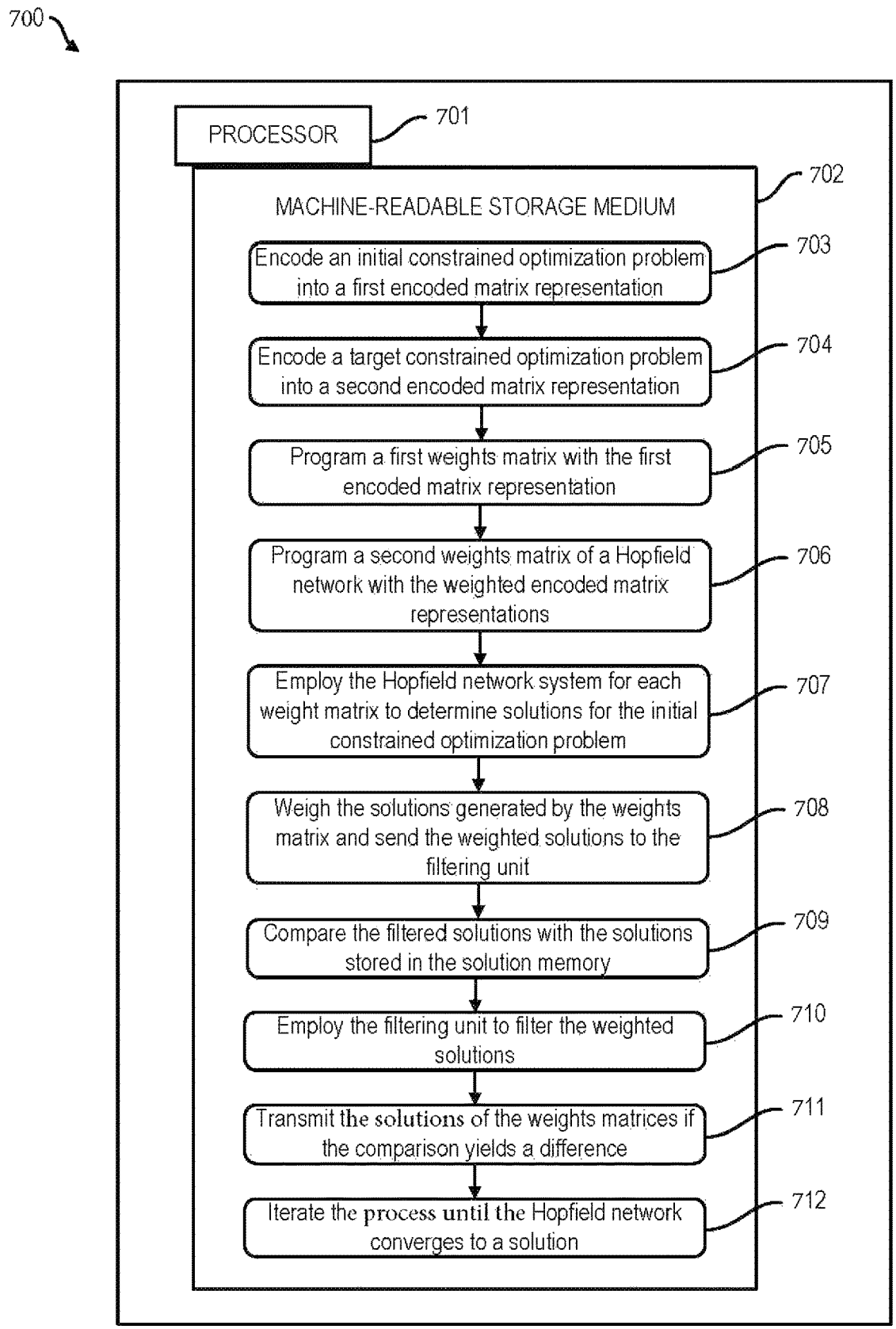
FIG. 7 is an illustration of a computing system, according to one or more examples of the present disclosure, according to one or more implementations of the present disclosure.

FIG. 7 is an illustration of a computing system 700, according to one or more examples of the present disclosure. The computing system 700 may include a non-transitory computer readable medium 702 that includes computer executable instructions 703-712 stored thereon that, when executed by one or more processing units 701 (one shown), causes the one or more processing units 701 (e.g., a digital processor) to determine a solution to a target constrained optimization problem, according to one implementation of the present disclosure. Computing system 700 may be implemented, for example by the Hopfield network system 600 illustrated in FIG. 6.

Computing system 700 may employ a Hopfield network system (e.g., Hopfield network system 200 as illustrated in FIG. 2). Computer executable instructions 703 include encoding an initial constrained optimization problem into a first encoded matrix representation (e.g., Hamiltonian matrix). Computer executable instructions 704 include encoding a target constrained optimization problem into a second encoded matrix representation. Computer executable instructions 705 include programming the first weights matrix 601 with the first encoded matrix representation.

Next, computer executable instructions 706 include programming a second weights matrix 602 of a Hopfield network with the weighted encoded matrix representations. After the weights matrices 601, 602 are programmed with the weighted encoded matrix representations, the computing system 700 may execute computer executable instructions 707 to determine solutions to the initial constrained optimization problem. In addition, the computing system 700 includes computer executable instructions 708 to weigh the solutions generated by the weights matrices 601, 602 and send 605 the weighted solutions to the filtering unit 603. Computer system 700 also includes computer executable instructions 709 which includes comparing the filtered solutions with the solutions stored in the solutions memory.

Furthermore, the computer system 700 includes computer executable instructions 710 to filter the weighted solutions stored in the solutions memory 604. In addition, the computer system 700 includes computer executable instructions 711 to transmit the solutions of the weights matrices if the comparison yields a difference. Further, the computer system 700 includes computer executable instructions 712 which includes iterating the process until the Hopfield network converges onto a solution.

Figure 8:
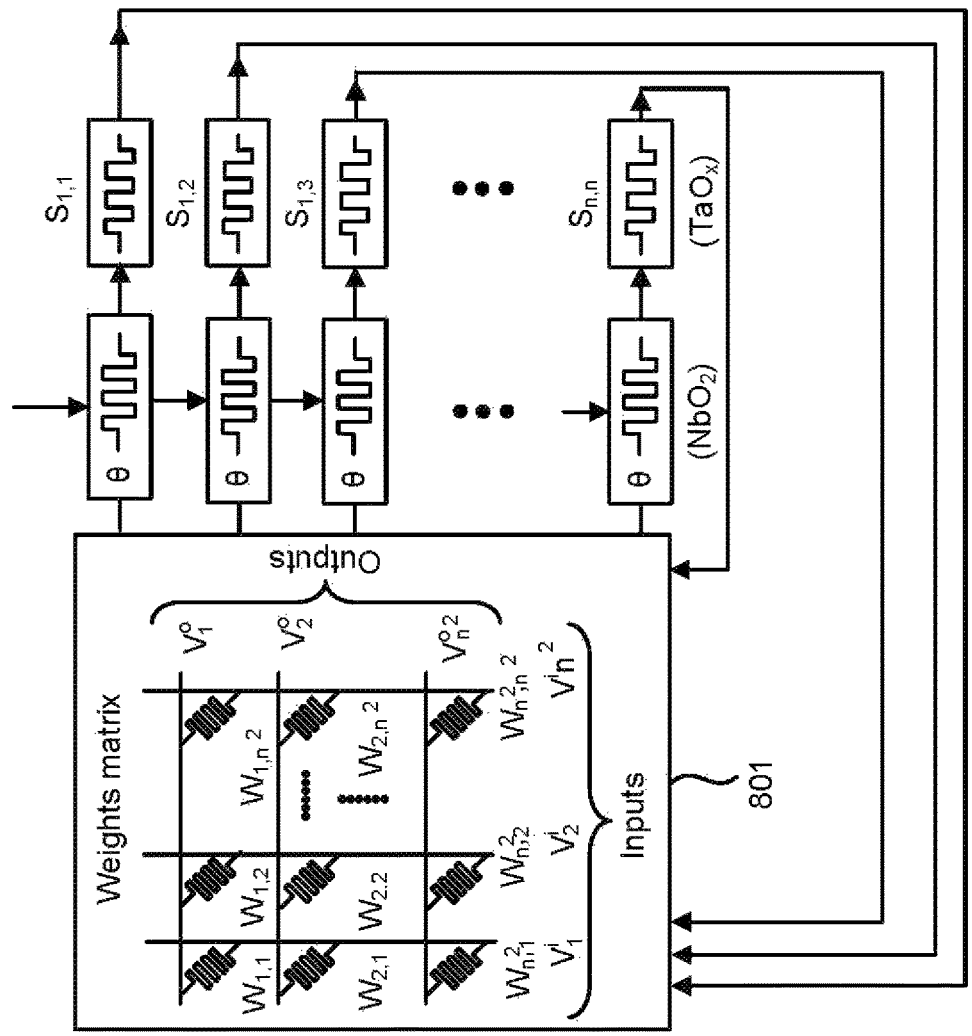
FIG. 8 is an illustration of yet another Hopfield network system which implements a weighted hybrid matrix representation, according to one or more implementations of the present disclosure.

FIG. 8 is an illustration of a Hopfield network system 800 which implements a weighted hybrid matrix representation, according to one or more implementations of the present disclosure. As shown in FIG. 8, a weights matrix 801 is programmed with a hybrid matrix representation of an initial simple constrained optimization problem and a target constrained optimization problem. The hybrid matrix representation may include a hybrid of a Hamiltonian associated with a simple constrained optimization problem and a Hamiltonian associated with a target constrained optimization problem. The Hopfield network system 800 can be programmed with the hybrid Hopfield network Hamiltonian function to determine a solution to the target constrained optimization problem. As such, the Hopfield network system iterates until it converges to a solution.

Figure 9:
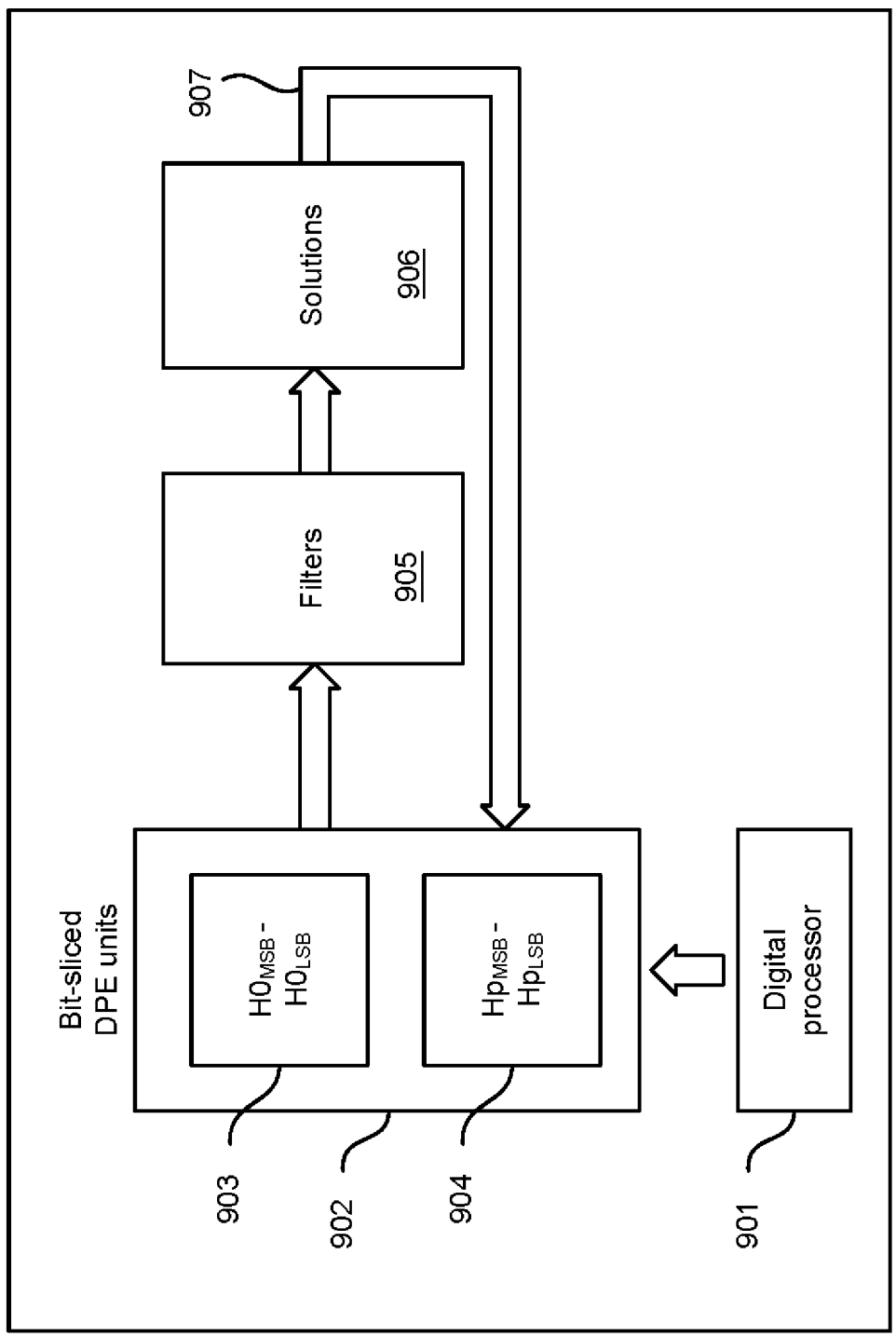
FIG. 9 is an illustration of a system which employs a dot-product engine architecture to implement bit slicing during a Hopfield network process, according to one or more implementations of the present disclosure.

FIG. 9 is an illustration of a Hopfield network system 900 which employs a DPE architecture to implement bit slicing during a Hopfield network process, according to one or more implementations of the present disclosure. Notably, the implementation shown in FIG. 9 employs a digital processor 901 (e.g., a weights programming unit which is separately shown in FIGS. 2 and 6) and a DPE. In one implementation, the Hopfield network system 900 shown can be used to employ "coarse tuning" of a solution to a target constrained optimization, and in additional implementations, employ "fine tuning" to further optimize solutions obtained by a Hopfield network employed on a DPE architecture.

In some implementations, employing bit slicing includes "splitting the bits" of the Hamiltonian matrix of the simple problem into X number of matrices associated with a least significant bit to a most significant bit. In some implementations, the Hamiltonian matrices are created for the most significant bit and the lesser significant bits for both simple and target constrained optimization problems.

Furthermore, employing bit slicing by "splitting the bits" of the Hamiltonian matrix of the target constrained optimization problem into Y number of matrices from a least significant bit to a most significant bit. In some implementations, the Hamiltonian matrices are created for the most significant bit and the lesser significant bits for both simple and target constrained optimization problems.

For example, to determine a solution to a target constrained optimization problem, the target problem may be encoded into a Hopfield network Hamiltonian matrix. In addition, a simple problem with a known solution may also be encoded into a Hamiltonian. Bit-slicing may be instituted to divide each respective Hamiltonian matrices into two or more matrices.

In some implementations, a solution to the most significant bit (MSB) of an initial easy problem is determined. A weights matrix of a DPE may be re-programmed via a weights programming unit by adding a fraction of the bits of a constrained optimization problem. Afterwards, the Hopfield network system may be employed to perform energy minimization, following which the weights matrix is re-programmed with a larger fraction of the target constrained optimization problem with greater bit precision. Accordingly, a sequence of programming a weights matrix in one instance could be represented as follows:

$$H_O = H_O$$
$$H_1 = 2H_{0MSB}$$
$$H_2 = (1 - 1/x) * (2^n \ H_{0MSB} + 2^{N-1} \ H_{0MSB-1}) + (1/x) * (2^n H_{PMSB})$$
$$H_3 = (1 - 2/x) * (2^n \ H_{0MSB} + 2^{N-1} \ H_{0MSB-1} + 2^{N-1} \ H0_{MSB-2}) +$$
$$(2/x) * (2^n \ H_{PMSB} + 2^{N-1} \ H_{0MSB-1}) \ ...$$
$$...$$
$$...$$
$$...$$
$$H_x = H_P$$

Where x=total number of steps taken; $H_0$ is the Hamiltonian of a simple problem; Hp is the Hamiltonian of a target constrained optimization problem, $H_1 \ldots H_X$ are the Hamiltonians used to program a weights matrix at each subsequent iteration.

Adiabatic annealing enables the Hopfield network system to neglect several of the less significant bits since there may be a higher probability of converging to a solution even before introduction of the matrices with full precision.

In one implementation, a Hamiltonian matrix is created for a most significant bit associated with the simple problem and another Hamiltonian matrix is created for the lesser significant bits to a target constrained optimization problem.

For example, if "1.2" represents a Hamiltonian associated with a simple problem, a Hamiltonian matrix may be created for the most significant bit (i.e., "1") and also for the lesser significant bits (i.e., "2"). In this example, the lesser significant bit is also the same as the least significant bit (i.e., "2").

It should be appreciated by those having ordinary skill in the art that Hamiltonian matrices may be created for the most significant bit, lesser significant bits, and the least significant bit for both the simple problem or a target constrained optimization problem. In one implementation, Hamiltonian matrices are created for the most significant bit and the lesser significant bits for both simple and target constrained optimization problems. In yet another implementation, the target constrained optimization problem encoded as a Hamiltonian matrix may contain a first matrix which contains a first half of the bits associated with the target constrained optimization problem and a second matrix which contains a second half of the bits associated with the target constrained optimization problem.

In one implementation, a digital processor 901 may program a weights matrix (e.g., weights matrix 202 within a Hopfield network 200 FIG. 2) with input from both the simple and target constrained optimization according to one or more Hamiltonian matrices associated with selected bits. For example, the digital processor 901 may include, as input, the Hamiltonian matrices associated with the most significant bits of the simple problem and the target constrained optimization problem as illustrated by Hamiltonian matrices blocks 903, 904 of Hopfield network system 902.

In some implementations, the filtering unit 905 of system 900 can filter the solutions filtered by the weights matrix 202 (FIG. 2) and the solutions memory 906 can receive convergence solutions (e.g., $S_{n,n}$) to a constrained optimization problem filtered by the filtering unit 905. Each iterative solution may be fed back (e.g., path 907) to the Hopfield network system 902 until the Hopfield network system 902 converges to a solution for each respective significant bit (e.g., MSB) and for all bits encoded as Hamiltonian matrices.

The Hopfield network system 900 may determine that it has converged onto a solution by comparing a presently-obtained solution to a previously-obtained solution. In some implementations, the Hopfield network system 900 may not process each bit encoded as a Hamiltonian matrix if it determines that it has converged onto a solution and that further processing will result in diminishing returns.

Figure 10:
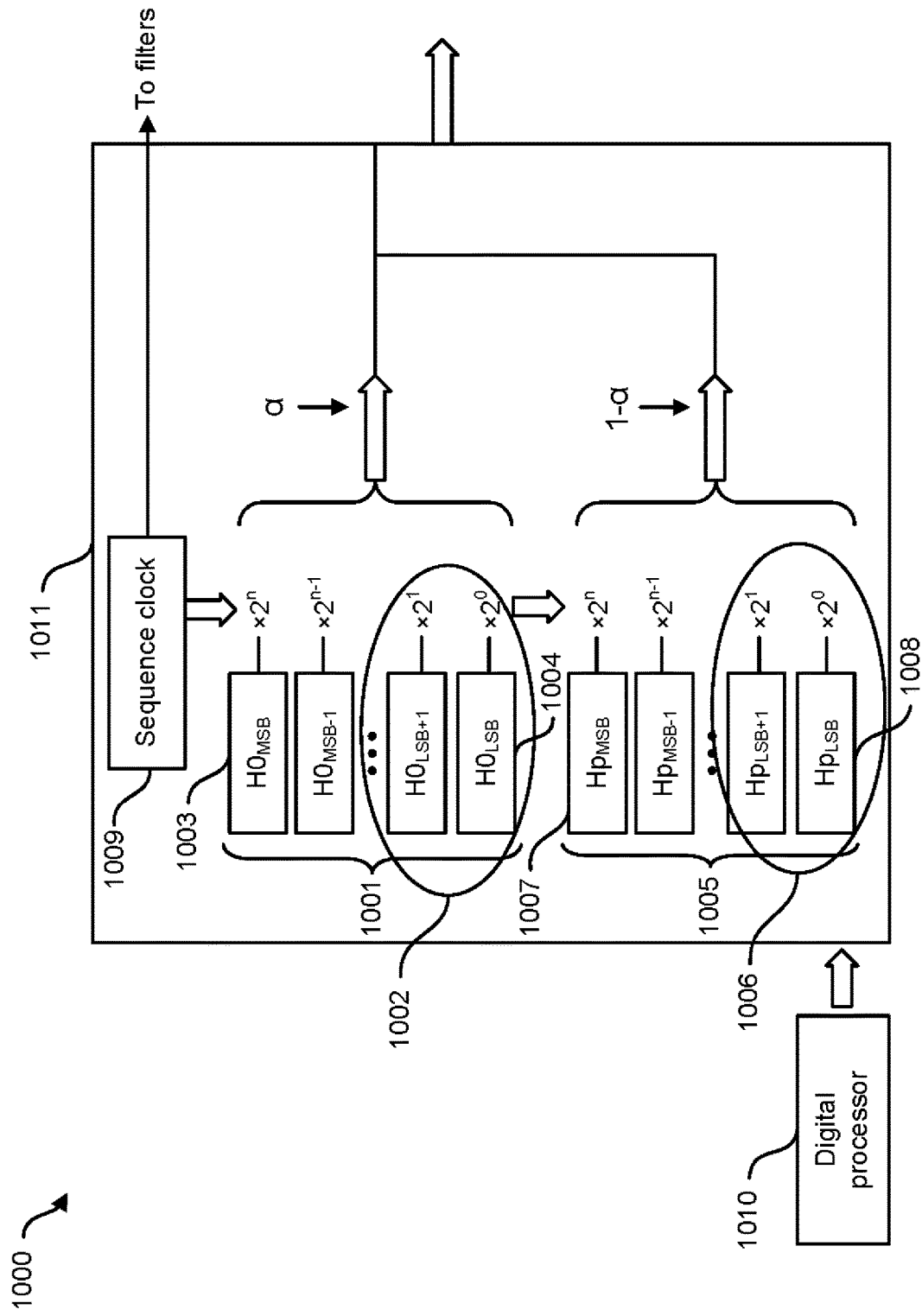
FIG. 10 is an illustration of one instance of a bit-slicing unit employed within a dot-product engine architecture, according to one or more implementations of the present disclosure.

FIG. 10 is an illustration of one instance of a bit-slicing unit employed within a DPE architecture, according to one or more implementations of the present disclosure. The instance of the bit-slicing process employed within a DPE architecture may be implemented by a unit 1011 within a Hopfield network 1000.

In some implementations, both a simple problem and a target constrained optimization problem may be encoded as Hamiltonian matrices. In one implementation, a set 1001 of Hamiltonian matrices that is associated with the simple problem Hamiltonian matrices for a least significant bit 1004 and for successive bits (e.g., lesser significant bits 1002) to the most significant bit (Hamiltonian matrix 1003).

Likewise, a set 1005 of Hopfield network Hamiltonian matrices that is associated with the target constrained optimization problem includes Hamiltonian matrices for a least significant bit 1008 and for successive bits (e.g., lesser significant bits 1006) to the most significant bit (Hamiltonian matrix 1007). A digital processor 1010 may be used to program the Hopfield network Hamiltonian matrix onto a weights matrix 202 (e.g., FIG. 2).

In some implementations, the Hopfield network system 1000 may employ a sequence clock 1009 to feed the solutions obtained from the weights matrix 202 (e.g., FIG. 2) or weights matrices 601, 602 (e.g., FIG. 6) into the filter units 604 in sequence. For example, the Hopfield network system 1000 may feed a weighted sum (a) into the filtering units.

Figure 11A:
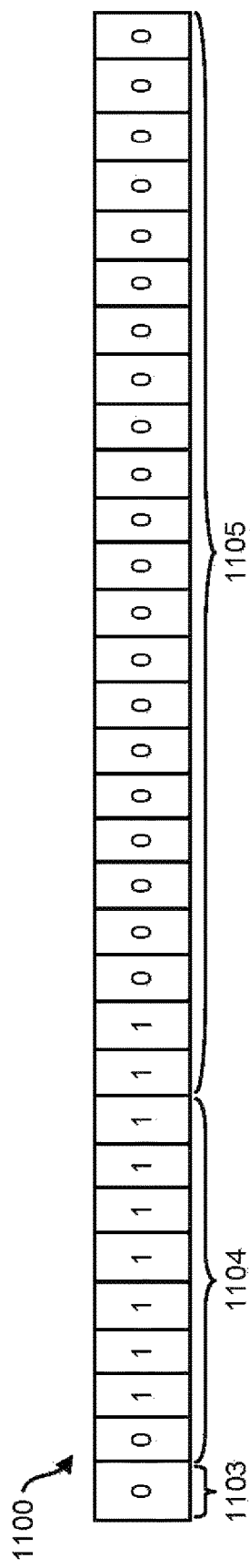
FIG. 11A is an illustration of a bit matrix of a Hopfield network Hamiltonian associated with a simple problem.

FIG. 11A is an illustration of a bit matrix 1100 of a Hopfield network Hamiltonian associated with a simple problem. For example, a Hamiltonian associated with a simple problem may be '1.5.' For instance, a simple problem for which can be represented by '1.5' could be a "next move" on a board game. In the implementation shown, bit matrix 1100 stores an IEEE 754-bit format for 1.5 in one implementation. Bit matrix 1100 includes a sign bit 1103 (e.g., one bit), exponent bits 1104 (e.g., 8 bits), and significant bits 1105 (e.g., 23 bits).

Figure 11B:
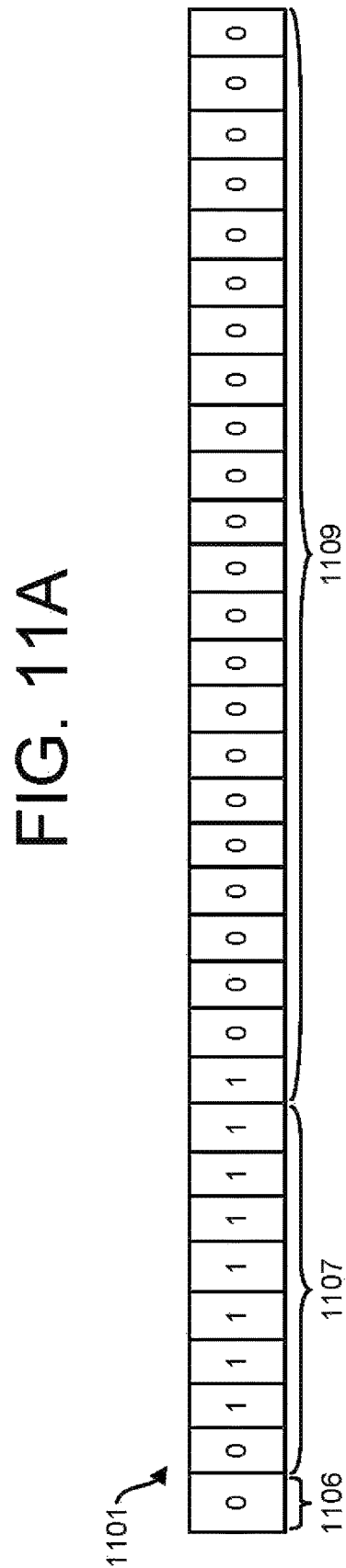
FIG. 11B is an illustration of a bit matrix of a most significant bit associated with the Hamiltonian associated with the simple problem of FIG. 11A.

FIG. 11B is an illustration of a bit matrix 1101 of a most significant bit associated with the Hamiltonian associated with the simple problem of FIG. 11A. For example, the most significant bit associated with the simple problem is '1.' Bit matrix 1101 stores the IEEE 754-bit format for '1.0.' Bit matrix 1101 includes sign bit 1106 ('0), exponent bits 1107, and significant bits (e.g., mantissa) 1109.

Figure 11C:
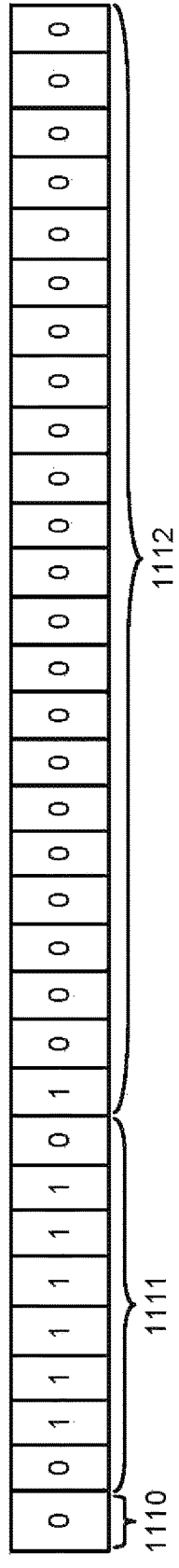
FIG. 11C is an illustration of a bit matrix of lesser significant bits associated with the Hamiltonian associated with the simple problem of FIG. 11A.

FIG. 11C is an illustration of a bit matrix 1102 of lesser significant bits associated with the Hamiltonian associated with the simple problem of FIG. 11A. For example, the lesser significant bits associated with the simple problem is '0.5.' Bit matrix 1102 stores the IEEE 754-bit format for '0.5' Bit matrix 1102 includes sign bit 1110, exponent bits 1111, and significant bits 1112.

Figure 12:
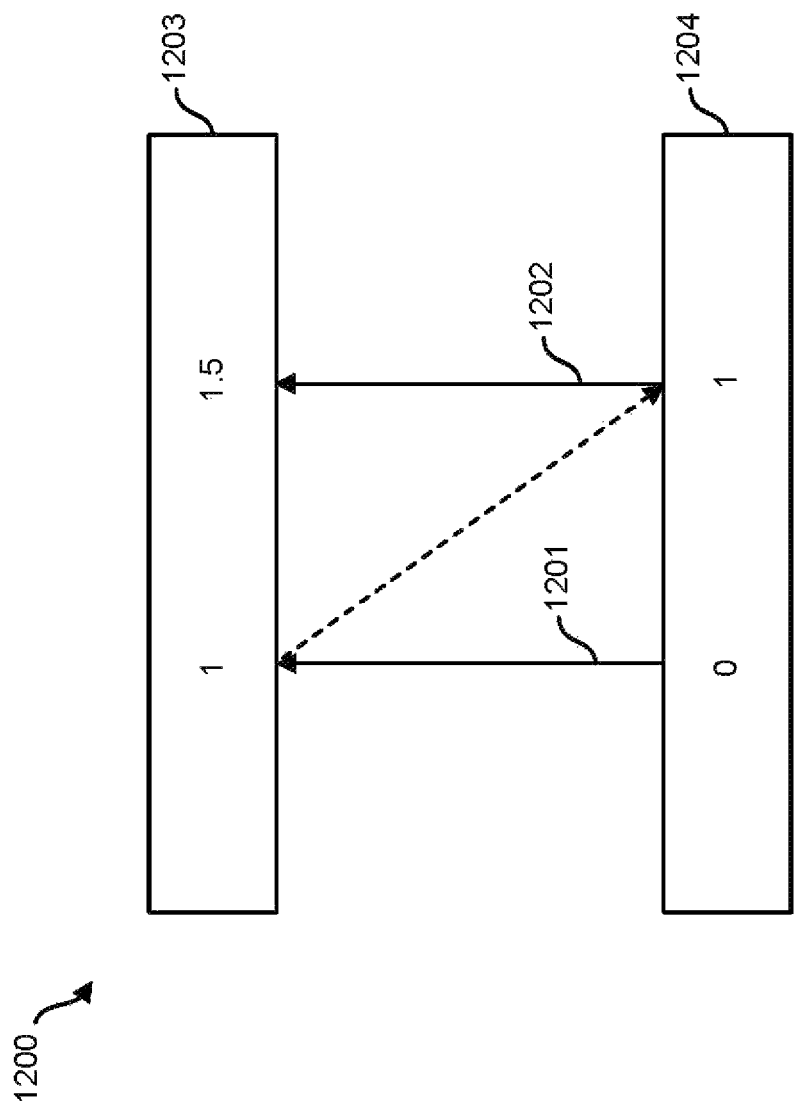
FIG. 12 is an illustration of one manner of employing adiabatic annealing and bit slicing for the simple problem.

FIG. 12 is an illustration of one manner of employing adiabatic annealing and bit slicing for the simple problem. In particular, FIG. 12 illustrates a model 1200 that shows how adiabatic annealing can be employed. Model 1200 includes benches 1203, 1204 which illustrates that a solution to a simple problem (e.g., path 1201) can be determined and then a solution to an advanced problem (e.g., path 1202) can be also more readily determined.

Figure 13A:
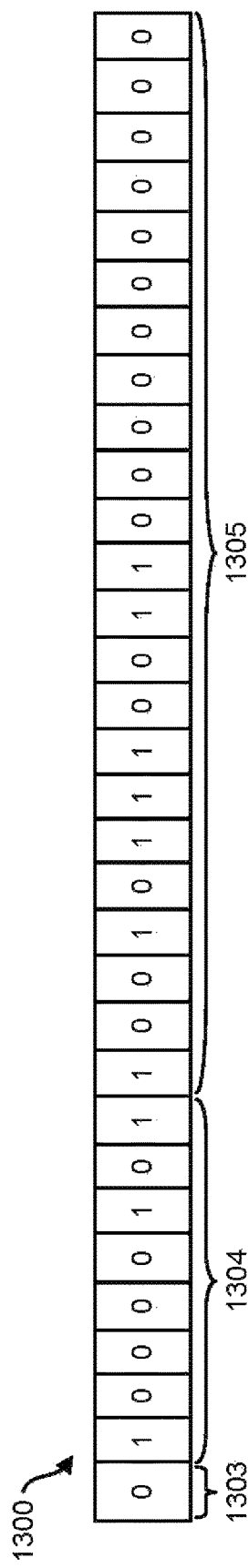
FIG. 13A is an illustration of a bit matrix of a Hamiltonian associated with a target constrained optimization problem.

FIG. 13A is an illustration of a bit matrix 1300 of a Hamiltonian associated with a target constrained optimization problem. For example, a Hamiltonian associated with a complex target constrained optimization problem may be represented as '101.796875.' For instance, a target constrained optimization problem for which can be represented by '101.796875' could be a schedule for a train system in a major city. Bit matrix 1300 stores the IEEE 754-bit format for '1.5.' Bit matrix 1300 includes a sign bit 1303 (e.g., one bit), exponent bits 1304 (e.g., 8 bits), and significant bits 1305 (e.g., 23 bits).

Figure 13B:
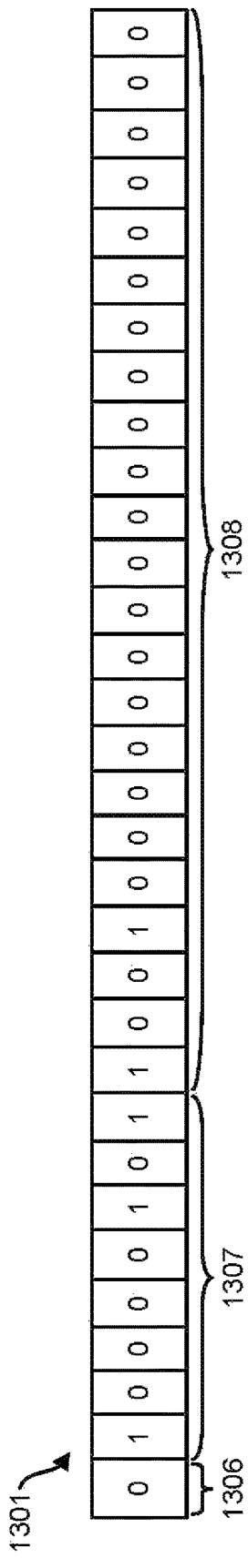
FIG. 13B is an illustration of a bit matrix of a most significant bit associated with the Hamiltonian associated with the target constrained optimization problem.

FIG. 13B is an illustration of a bit matrix 1301 of a most significant bit associated with the Hamiltonian associated with the target constrained optimization problem. The most significant bit associated with the complex problem is '101.' Bit matrix 1301 stores the IEEE 754-bit format for '101.' Bit matrix 1301 includes sign bit 1306, exponent bits 1307, and significant bits 1308.

Figure 13C:
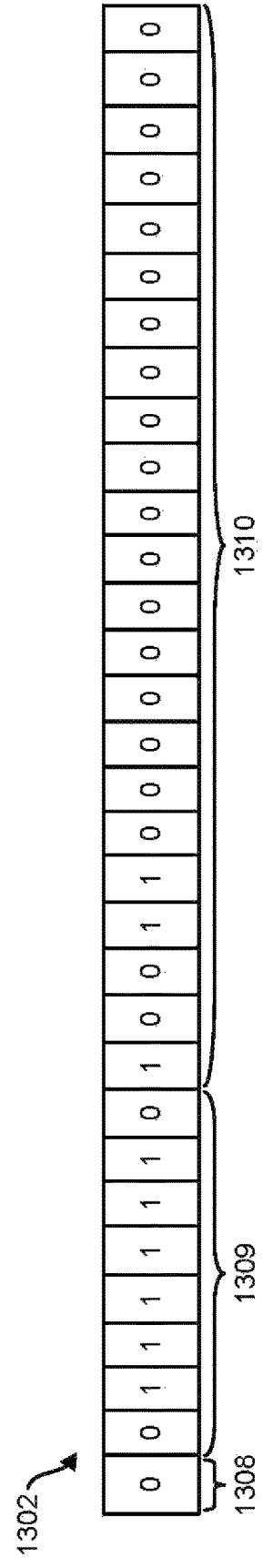
FIG. 13C is an illustration of a bit matrix of lesser significant bits associated with the Hamiltonian associated with the target constrained optimization problem.

FIG. 13C is an illustration of a bit matrix 1302 of lesser significant bits associated with the Hamiltonian associated with the target constrained optimization problem. For example, the lesser significant bits associated with the complex problem is '0,796875.' Bit matrix 1302 stores the IEEE 754-bit format for '0.796875.' Bit matrix 1302 includes sign bit 1308, exponent bits 1309, and significant bits 1310.

Figure 14:
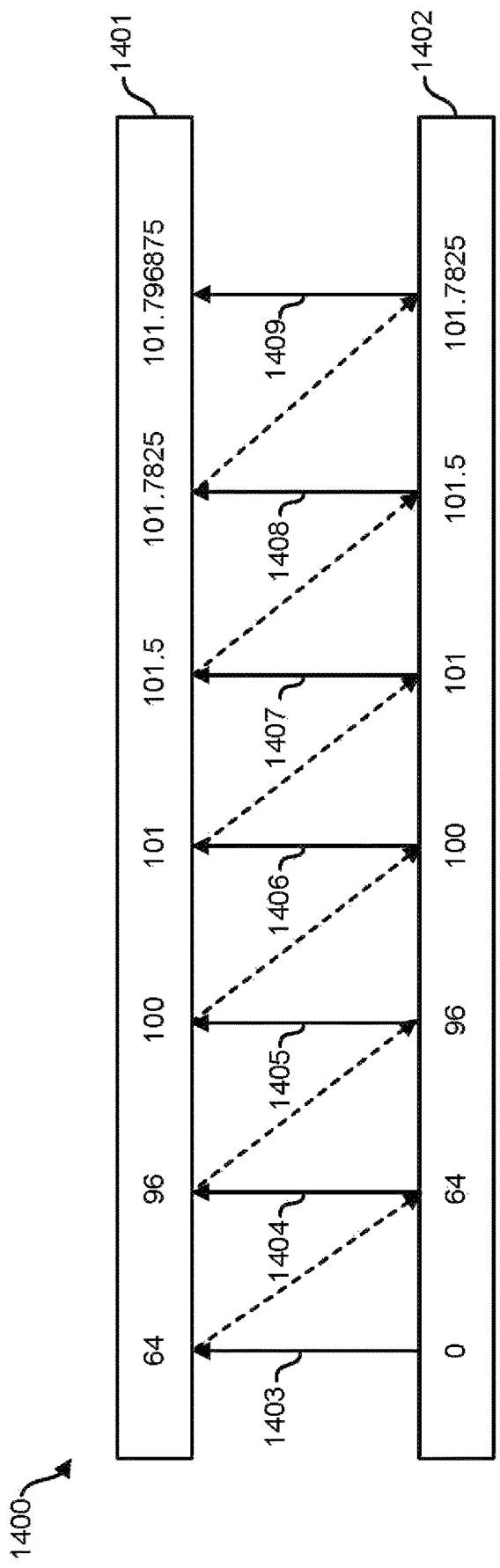
FIG. 14 is an illustration of a manner of employing adiabatic annealing and bit slicing for the target constrained optimization problem.

FIG. 14 is an illustration of a manner of employing adiabatic annealing and bit slicing for a target constrained optimization problem. In particular, FIG. 14 illustrates a model 1400 that shows how adiabatic annealing can be employed. Model 1400 includes 1401, 1402 which illustrates that solutions to a series of complex problems can be obtained (e.g., paths 1403-1409) such that a solution to the target constrained optimization problem can be more readily obtained.

Figure 15:
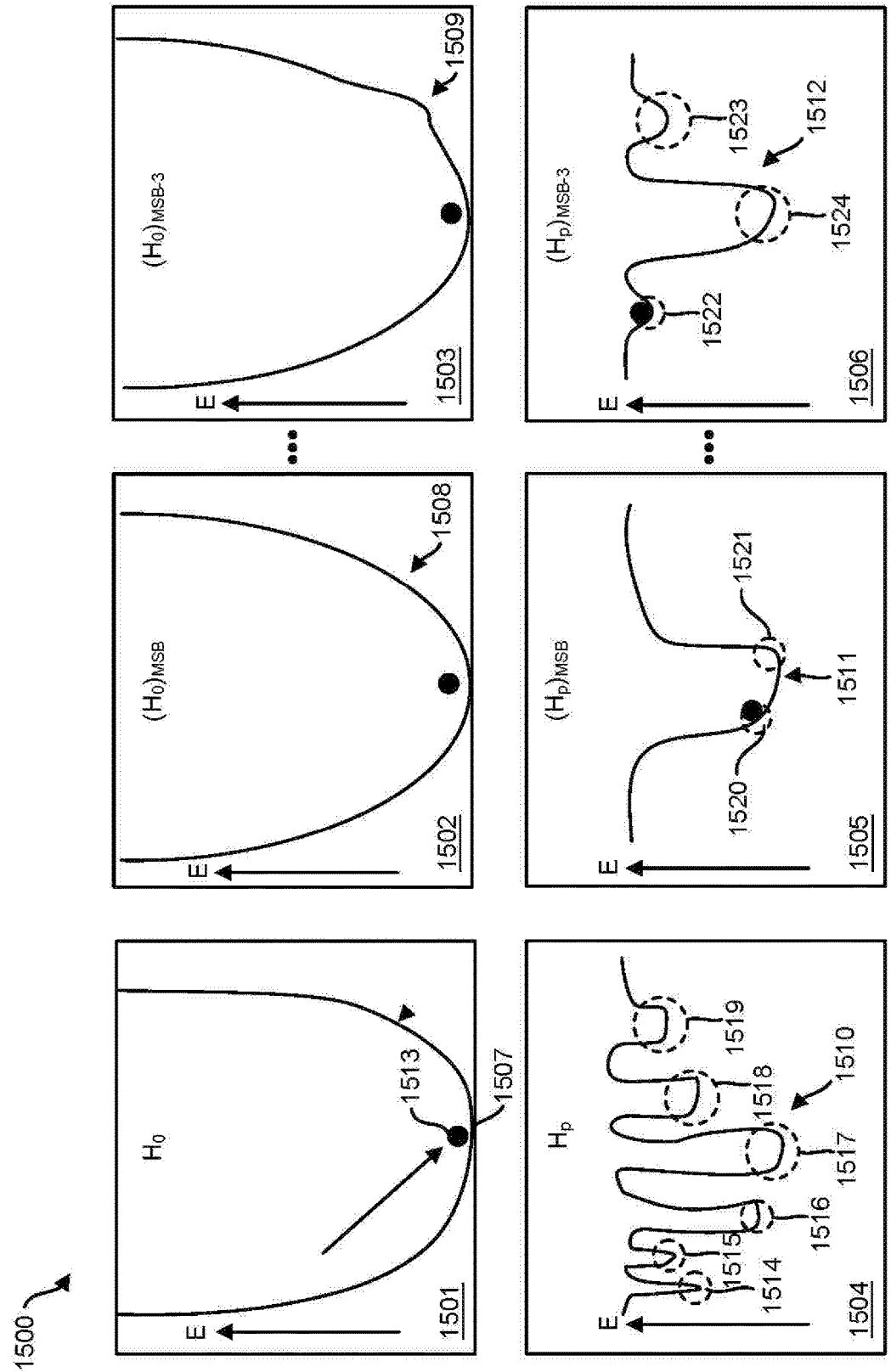
FIG. 15 is an illustration of a set of energy functions associated with the most significant bit associated with the Hamiltonian of the simple problem and the target constrained optimization problem.

FIG. 15 is an illustration of a set 1500 energy functions associated with the most significant bit associated with the Hamiltonian of the simple problem and the target constrained optimization problem. Energy function 1501 may be associated with a constrained optimization problem with a widely known or easily achievable solution associated with an optimal lowest energy stage. Energy function 1501 may also be associated with an initial Hamiltonian ($H_0$). Energy function 1501 depicts a simple parabolic curve with a global minimum 1507 as shown by the presence of energy particle 1513 at the optimal lowest energy state. In some implementations, the initial constrained optimization problem associated with energy function 1501 may not be associated with the target constrained optimization problem, unlike the constrained optimization problems associated with energy functions 1502-1506, as will be described below.

In some implementations, the initial constrained optimization problem associated with energy function 1501 may be encoded as a plurality of matrix representations and then programmed into the weights matrix (e.g., weights matrix 202 of FIG. 2) of the Hopfield network system (e.g., Hopfield network system 200 of FIG. 2) via the weights programming unit 201. The Hopfield network system 200 can be used to determine an optimal solution to the constrained optimization problem associated with the energy function 1501 (FIG. 15).

Energy function 1502 depicts a parabolic curve 1508 associated with the most significant bit associated with an initial Hamiltonian ($H_0$). Likewise, energy function 1503 depicts a parabolic curve 1509 associated with a third most significant bit (MSB-3) associated with an initial Hamiltonian.

Energy function 1504 depicts a curve 1510 associated with a target constrained optimization problem (Hp). Curve 1510 has several local minima 1514-1516, 1518, and 1519. In addition, curve 1510 has a global minimum 1517. To determine a solution to the constrained optimization problem (Hp), the most significant bits associated with the Hamiltonians associated with the target constrained optimization problem (HP) may be first generated and then solutions are determined therefore.

In the example shown, energy functions 1505, 1506 are the result of bit slicing and adiabatic annealing can be employed to determine a solution to the target constrained optimization problem. Energy function 1505 illustrates that an energy particle is at a point 1520 along the curve 1511. A Hopfield network system (e.g., Hopfield network system 200) as described herein can be employed to find the ground state (e.g., point 1521) which corresponds to a best solution to a constrained optimization problem.

Energy function 1506 may be associated with a third factor of a most significant bit associated with the target constrained optimization problem (HP). As shown, energy function 1506 has two local minima 1522, 1523 and a single global minimum 1524. The energy function is shown to be presently located in local minima 1522 along the curve 1512. A Hopfield network system (e.g., Hopfield network system 200) as described herein can be employed to find the global minimum 1524 of the energy function 1506.

Figure 16:
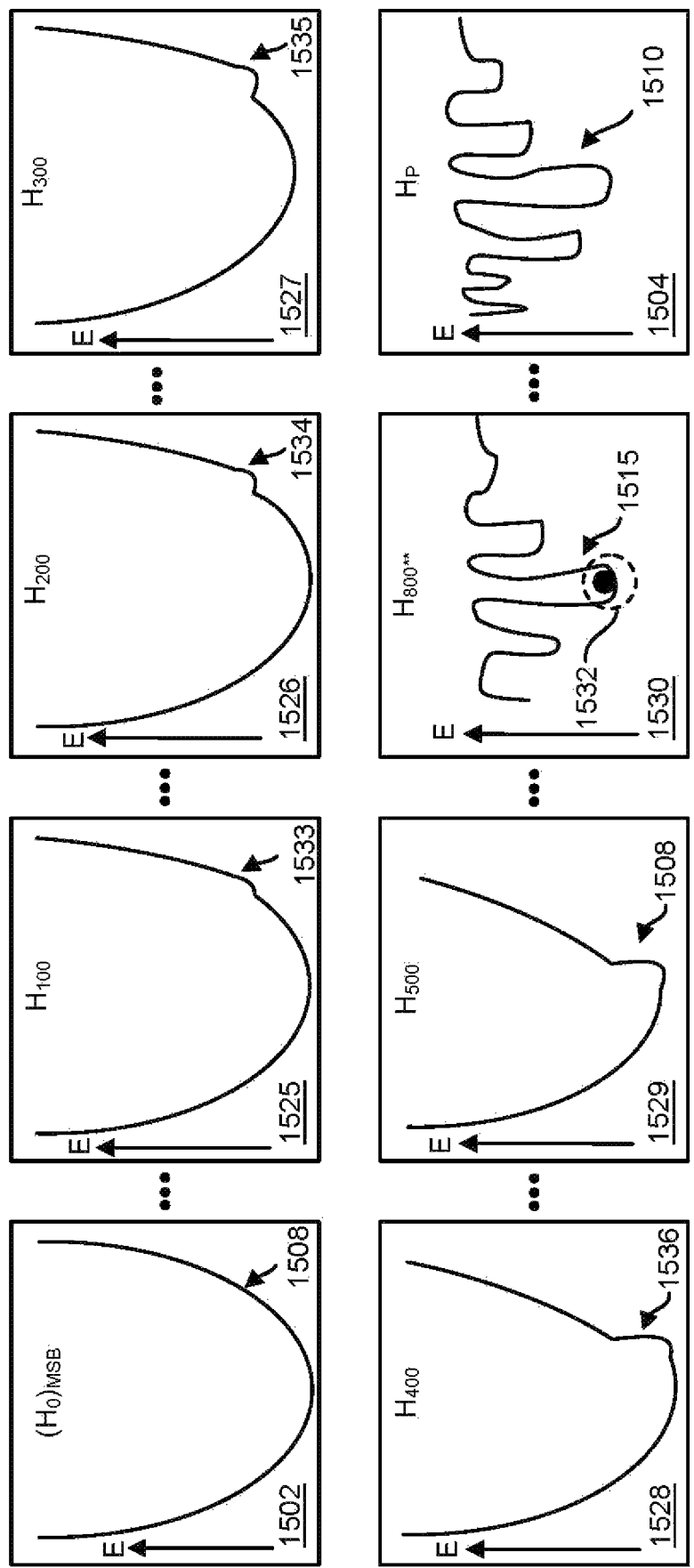
FIG. 16 is an illustration of a set of energy functions associated with a set of Hamiltonians that result from bit slicing and adiabatic annealing.

FIG. 16 is an illustration of set of energy functions associated with a set of Hamiltonians that result from bit slicing and adiabatic annealing. The set of energy functions illustrated in FIG. 16 include energy functions 1502, 1525, 1526, 1527, 1528, 1529, 1530, and 1504. Notably, energy function 1502 includes parabolic curve 1508 which is associated with the most significant bit of a simple problem. Next, energy function 1525 includes parabolic curve 1533 which represents the $100^{th}$ Hamiltonian function. Likewise, energy functions 1526-1530 include curves 1534, 1535, 1536, 1508, and 1515 which represent the $200^{th}$, $300^{th}$, $400^{th}$, $500^{th}$, and $800^{th}$ Hamiltonian functions.

Notably, the $800^{th}$ Hamiltonian function includes several local minima and a single global minimum 1532. Notably, an energy particle is located in global minimum 1532 in FIG. 16. As previously described, adiabatic annealing enables the Hopfield network system neglects several of the less significant bits since there may be a higher probability of converging to a solution to a target constrained optimization problem (HP) even before introduction of the matrices with full precision.

Figure 17:
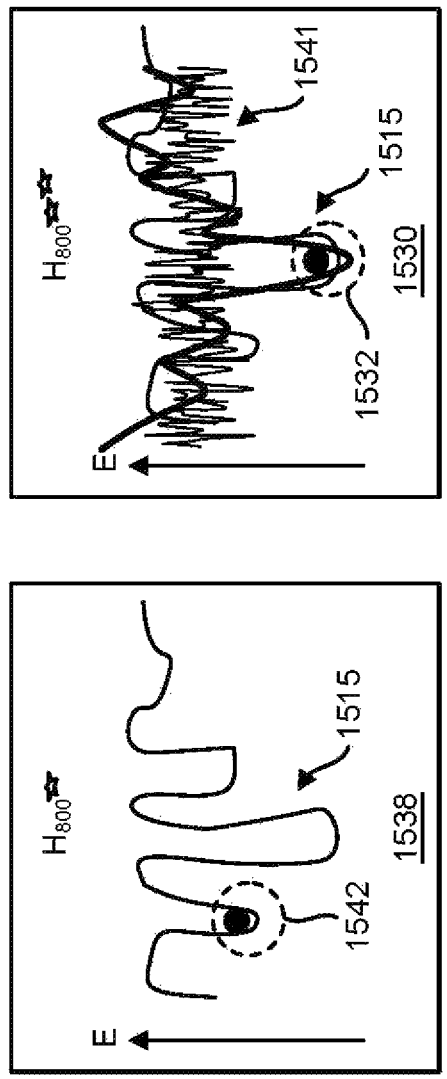
FIG. 17 is an illustration of a manner of implementing chaotic-assisted annealing, according to one implementation of the present disclosure.

FIG. 17 is an illustration of a manner of implementing chaotic-assisted annealing according to one implementation of the present disclosure. In particular, energy function 1538 includes curve 1515 which has several local minima. Notably, an energy function is present in local minima 1542 as shown in energy function 1538. As previously described, the utility of sequentially or slowly introducing a complex constrained optimization problem has been shown to significantly improve the probability of determining the global minimum that corresponds to the best solution to the target problem.

However, in addition to adiabatic annealing as described herein, stochastic noise or chaos can also be introduced into a Hopfield network system. In one implementation, stochastic noise or chaos (e.g., chaos-assisted annealing) is introduced into the Hopfield network system via intrinsic stochastic noise or chaos that is found in $NbO_2$ memristors. In some implementations, a quick convergence may necessitate a larger magnitude of chaos/stochasticity to aid in navigating the rapidly changing energy landscape. Alternatively, a slower convergence may necessitate a lower magnitude of chaos/stochasticity.

Figure 18:
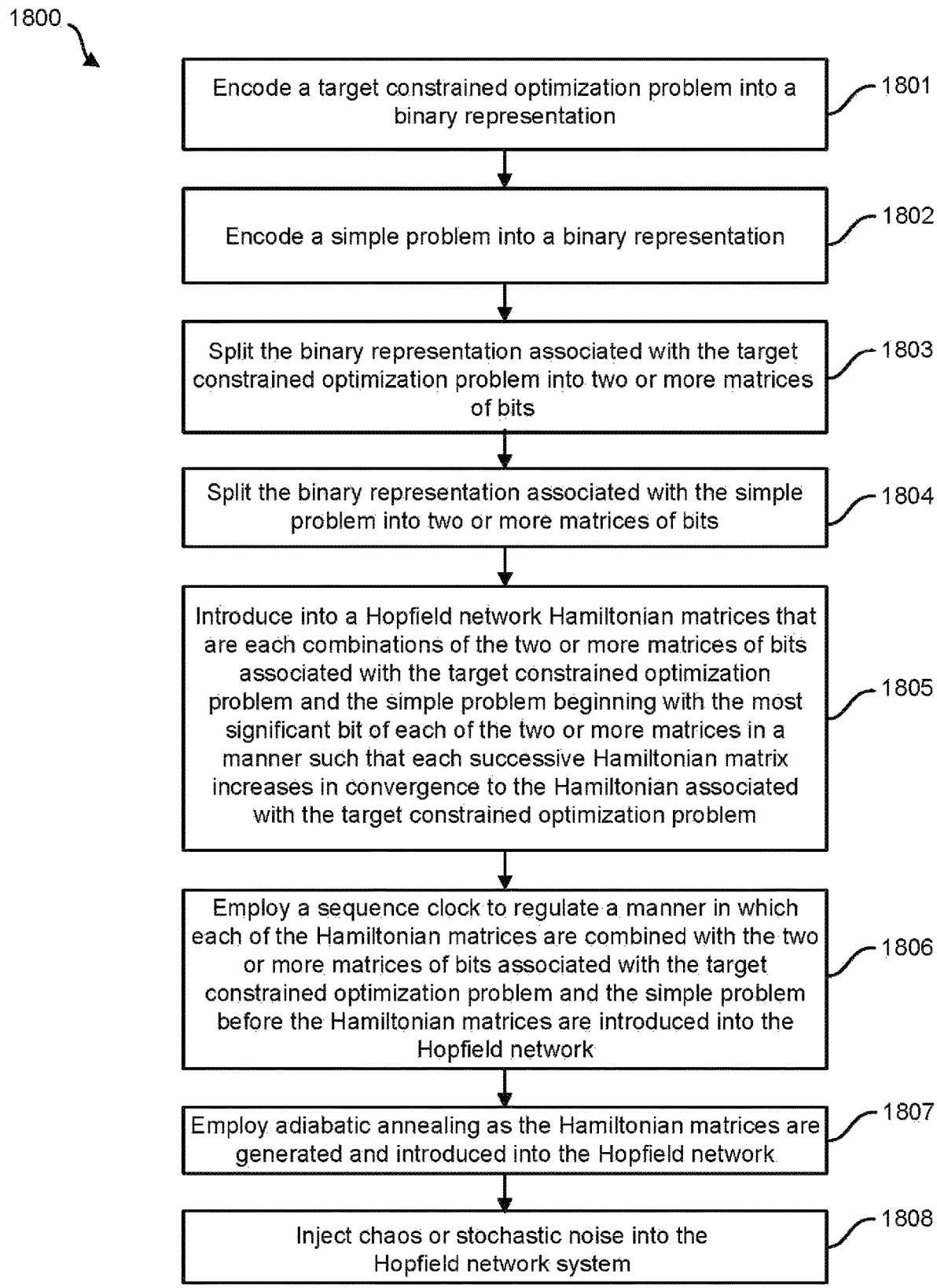
FIG. 18 is a flowchart for a method for determining a solution to a constrained optimization process by implementing bit slicing and adiabatic annealing, according to one or more implementations of the present disclosure.

FIG. 18 is a flowchart for a method 1800 of determining a solution to a constrained optimization process by implementing bit slicing and adiabatic annealing, according to one or more implementations of the present disclosure. The method 1800 may be implemented with the system illustrated in FIG. 10 and the Hopfield network system shown and described in reference to FIG. 2.

Method 1800 begins with encoding a target constrained optimization problem into a binary representation (block 1801). In some implementations, the binary representation includes a Hamiltonian representation of the target constrained optimization problem. Next, the method 1800 includes encoding a simple problem into a binary representation (block 1802). Further, the method 1800 includes splitting the binary representation associated with the target constrained optimization into two or more matrices of bits (block 1803). In addition, the method 1800 includes splitting the binary representation associated with the simple problem into two or more matrices of bits (block 1804).

Further, the method 1800 includes introducing into a Hopfield network Hamiltonian matrices that are each combinations of the two or more matrices of bits associated with the target constrained optimization problem and the simple problem beginning with the most significant bit of each of the two or more matrices in a manner such that each successive Hamiltonian matrix increases in convergence to the Hamiltonian associated with the target constrained optimization problem (block 1805). In some implementations, the Hamiltonian matrices are introduced into the Hopfield network in sequential steps with appropriate weighting.

In addition, the method 1800 includes employing a sequence clock to regulate a manner in which each of the Hamiltonian matrices are combined with the two or more matrices of bits associated with the target constrained optimization problem and the simple problem before the Hamiltonian matrices are introduced into the Hopfield network (block 1806). The method 1800 also includes employing adiabatic annealing as the Hamiltonian matrices are generated and introduced into the Hopfield network (block 1807). The method 1800 further includes injecting stochastic noise or chaos into the Hopfield network system (block 1808).

Figure 19:
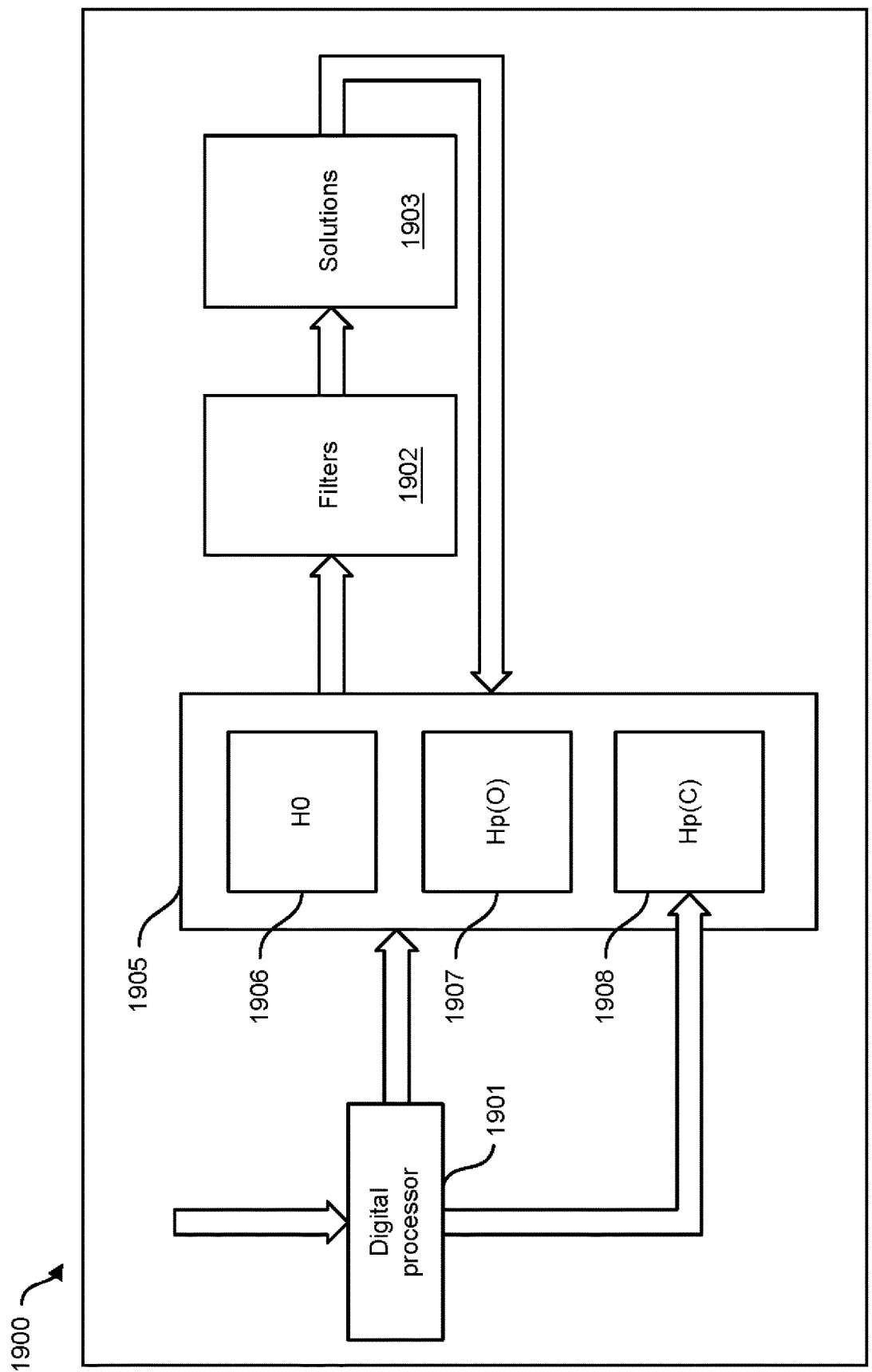
FIG. 19 is an illustration of a Hopfield network system which employs a dot-product engine architecture to generate solutions to target constrained optimization problems with dynamic objectives, according to one or more implementations of the present disclosure.

FIG. 19 is an illustration of a Hopfield network system 1900 which employs a DPE architecture to generate solutions to target constrained optimization problems with dynamic (e.g., modified) objectives, according to one or more implementations of the present disclosure. Notably, the implementation shown in FIG. 19 employs a digital processor 1901 (e.g., a weights programming unit which is separately shown in FIGS. 2 and 6).

In one implementation, a target constrained optimization problem is extracted of its objective and constraints. For example, to broadcast media (e.g., television program), an objective may be to deliver media of a quality within a certain specified range. A Hopfield network Hamiltonian matrix may be created for the objective to the target constrained optimization problem and the constraints of this problem. In addition, a Hopfield network Hamiltonian matrix may be created for a simple problem with a known solution.

In one implementation, a digital processor 1901 may program a weights unit with the encoded Hopfield network Hamiltonian matrix 1905 of the simple problem and then the encoded Hopfield network Hamiltonian matrix with the initial objective 1906 and the constraints 1908. The digital processor 1901 may be supplied with a data stream which may indicate that the constraints 1908 of the target constrained optimization problem has changed (e.g., a decrease in available bandwidth). In one implementation, the starting point for the Hopfield network process is the encoded Hopfield network Hamiltonian matrix of the simple problem.

In some implementations, the filtering unit 1902 of Hopfield network system 1900 can filter the solutions filtered by the weights matrix 202 (FIG. 2) and the solutions memory 1903 can receive convergence solutions (e.g., $S_{n,n}$) to a constrained optimization problem filtered by the filtering unit 1902.

In the event that the constraints 1907 has changed, the new constraints 1907 are encoded as a Hopfield network Hamiltonian matrix and fed into the Hopfield network system 1900 by the digital processor 1901. In one implementation, the starting point for the Hopfield network process is the encoded Hopfield network Hamiltonian matrix for the optimal solution generated for the previous target constrained optimization problem with the initial objectives and constraints. Accordingly, the Hopfield network system 1900 may continue to update the "starting point" for each subsequent change to the constraint. In addition, the implementation shown in FIG. 19 may employ adiabatic annealing, bit slicing, or simulated annealing to improve the ability of the Hopfield network system 1904 to effectively and/or efficiently converge onto optimal solutions for target constrained optimization problems.

Figure 20:
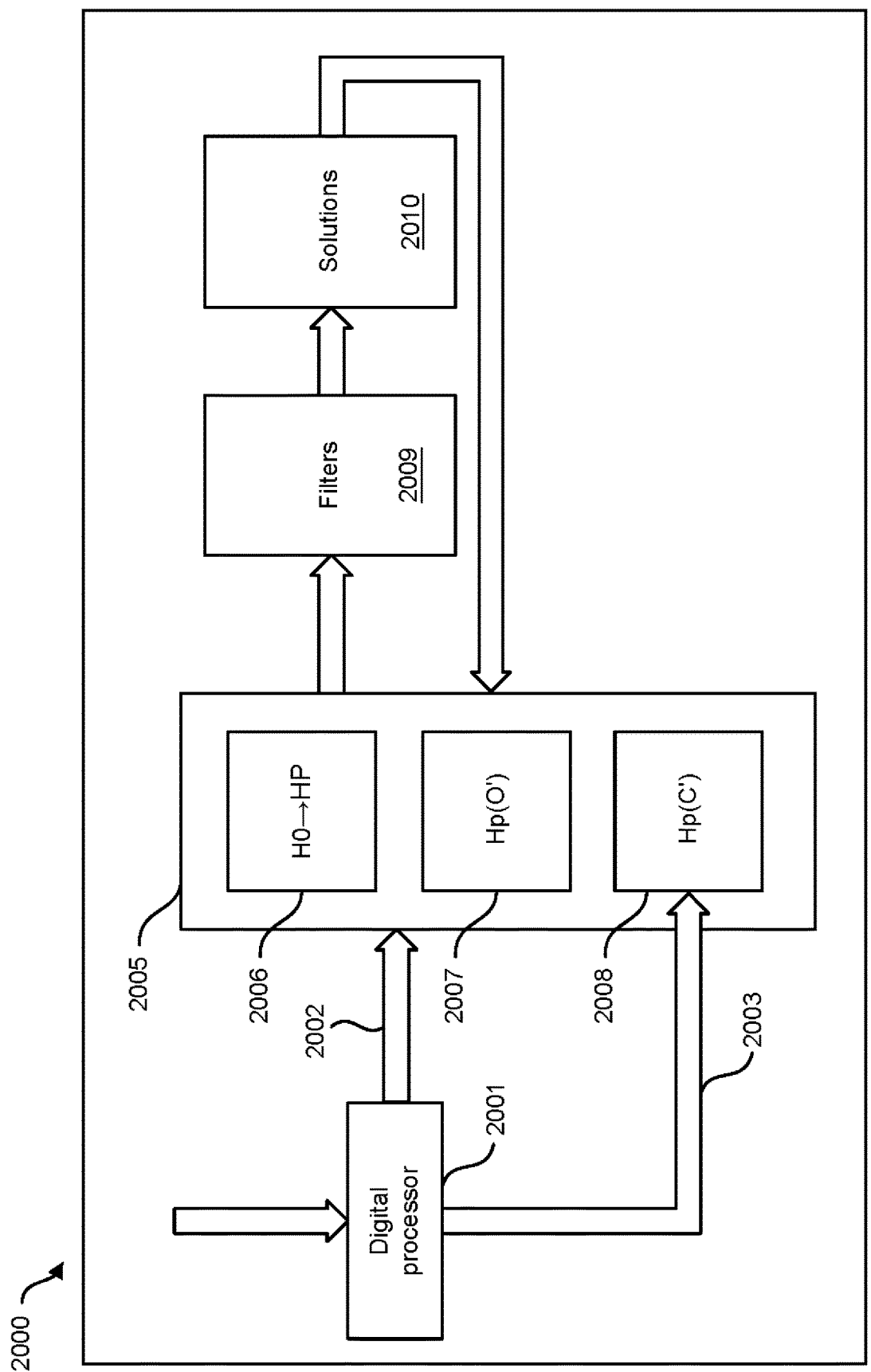
FIG. 20 is an illustration of a Hopfield network system which employs a DPE architecture to generate solutions for target constrained optimization problems with dynamic objectives and constraints, according to one or more implementations of the present disclosure.

FIG. 20 is an illustration of a Hopfield network system 2000 which employs a DPE architecture to generate solutions for target constrained optimization problems with dynamic objectives 2007 (e.g., Hp(O')) and constraints 2008 (e.g., Hp(C')), according to one or more implementations of the present disclosure. The Hopfield network system 2000 shown in FIG. 20 may be consistent with the implementation shown in relation to FIG. 19. A digital processor 2001 may receive as input a data stream 2003 which may associated with a target constrained optimization problem. In some implementations, the target constrained optimization problem may have dynamic objectives 2007 and one or more dynamic constraints 2008 each expressed as a Hopfield network Hamiltonian matrix. Notably, dynamic objectives 2007 and dynamic constraints 2008 may change dynamically according to requirements associated with the target constrained optimization problem.

In the implementation shown, a Hopfield network Hamiltonian matrix associated with a simple problem 2006 may be encoded onto a weights matrix (e.g., weights matrix 202—FIG. 2) of Hopfield network system 2000. Each of the encoded Hopfield network Hamiltonian matrices programmed onto a weights matrix may be used to determine a solution to the target constrained optimization process according to a method described herein. The Hopfield network system may be performed in sequence by applying Kirchoffs current law to sum the solutions determined for the simple problem and an objective (expressed as a Hopfield network Hamiltonian matrix). The sum may be sent to filters as discussed in reference to other implementations of the Hopfield network system.

In one implementation, a digital processor 2001 may program a weights unit with the encoded Hopfield network Hamiltonian matrix 2006 of the simple problem and then the encoded Hopfield network Hamiltonian matrix with the dynamic objectives 2007 and the constraints 2008. The digital processor 2001 may be supplied with a data stream which may indicate that the dynamic constraints 2008 of the target constrained optimization problem has changed (e.g., a decrease in available bandwidth). In one implementation, the starting point for the Hopfield network process is the encoded Hopfield network Hamiltonian matrix of the simple problem.

In some implementations, the filtering unit 2009 of Hopfield network system 2000 can filter the solutions filtered by the weights matrix 202 (FIG. 2) and the solutions memory 2010 can receive convergence solutions (e.g., $S_{n,n}$) to a constrained optimization problem filtered by the filtering unit 2009.

In the event that the dynamic constraints 2008 change, the new constraints are encoded as a Hopfield network Hamiltonian matrix and fed into the Hopfield network system 2000 by the digital processor 2001. In one implementation, the starting point for the Hopfield network process is the encoded Hopfield network Hamiltonian matrix for the optimal solution generated for the previous target constrained optimization problem with the initial objectives and constraints. Accordingly, the Hopfield network system 2000 may continue to update the "starting point" for each subsequent change to the constraint. In addition, the implementation shown in FIG. 20 may employ adiabatic annealing, bit slicing, or simulated annealing to improve the ability of the Hopfield network system 2000 to effectively and/or efficiently converge onto optimal solutions for target constrained optimization problems.

Figure 21:
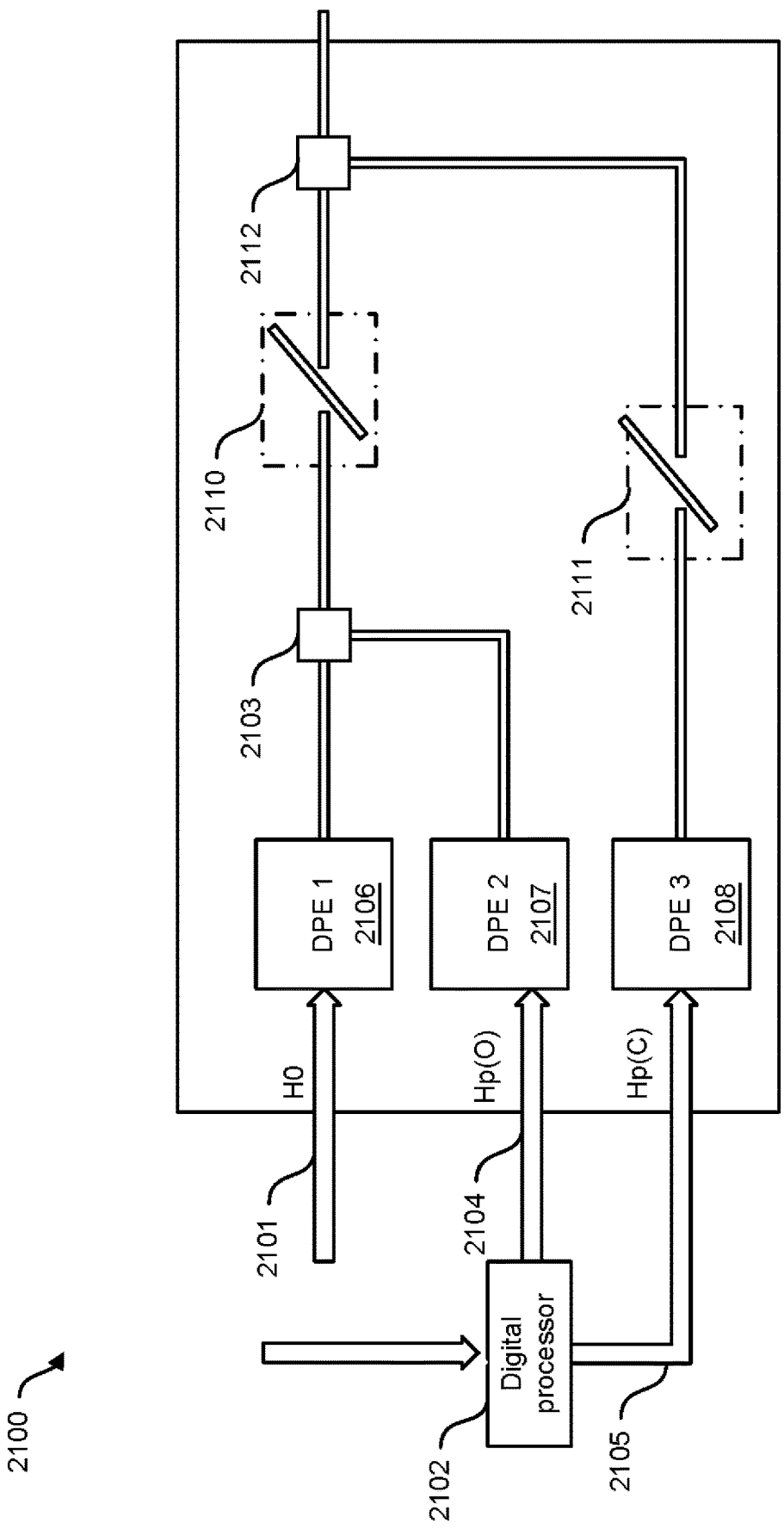
FIG. 21 is an illustration of a Hopfield network system which employs several DPE architectures to obtain solutions for target constrained optimization with dynamic constraints, according to one or more implementations of the present disclosure.

FIG. 21 is an illustration of a Hopfield network system 2100 which employs several DPE architectures 2106-2108 to obtain solutions for target constrained optimization with dynamic constraints, according to one or more implementations of the present disclosure. In one implementation, DPE architectures 2106-2108 receive Hamiltonian functions, as input 2101, 2104, 2105, associated with a simple problem, objectives to a target constrained optimization problem, and constraints to a target constrained optimization problem, respectively. As shown in FIG. 21, digital processor 2102 provides the Hamiltonian functions, as input 2104, 2105, for the objectives and constraints of a target constrained optimization problem.

A first summation unit 2103 may accept as input the solution determined for a simple problem and the solution determined for the objectives associated with a target constrained optimization problem obtained by DPE 2106 and DPE 2107. Notably, DPE 2106 and DPE 2107 may employ adiabatic annealing. In one implementation, the first summation unit 2103 may employ Kirchoff's current law to generate the sum of the received input. The calculated sum may be sent to the second summation unit 2112 after being passed through a timed gate 2110.

Likewise, the solution determined for the constraints associated with the target constrained optimization problem can be sent to the second summation unit 2112 after being passed through a timed gate 2111. Second summation unit 2112 may also employ Kirchoffs current law to generate the sum of the received input. The sum may be sent to filters as discussed in reference to other implementations of the Hopfield network system.

Figure 22:
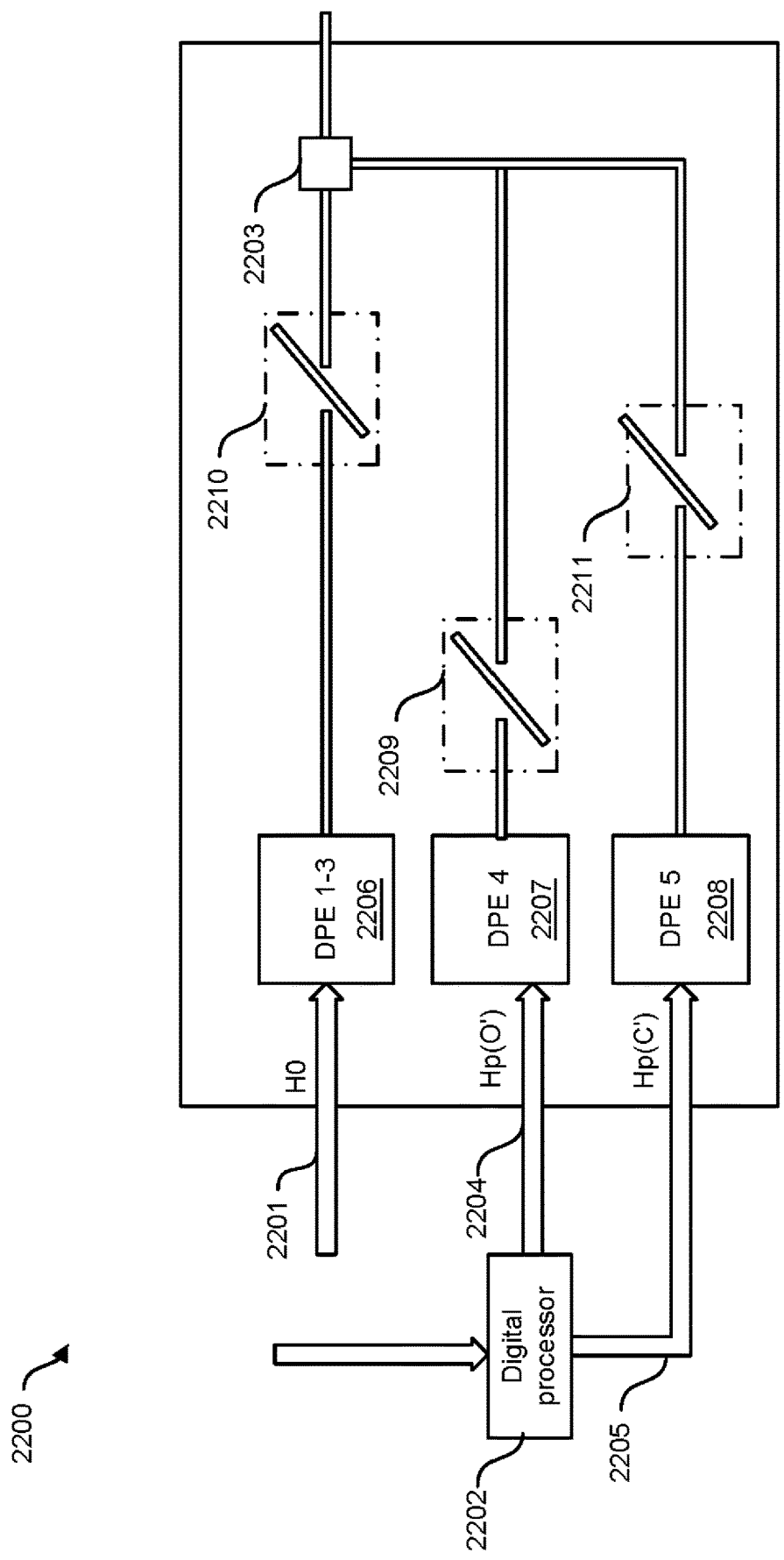
FIG. 22 is an illustration of a Hopfield network system which employs several dot-product engine architectures to obtain solutions for target constrained optimization with dynamic objectives and constraints, according to one or more implementations of the present disclosure.

FIG. 22 is an illustration of a Hopfield network system 2200 which employs several DPE architectures 2206-2208 to obtain solutions for target constrained optimization with dynamic objectives and constraints, according to one or more implementations of the present disclosure. In one implementation, DPE 2206 receive Hamiltonian functions 2201 associated with a simple problem, objectives to a target constrained optimization problem, constraints to a target constrained optimization problem. In one implementation, DPEs 2206 may consist of one or more (e.g., three) dot-product engines. DPE 2207 may receive Hamiltonian functions associated with dynamic objectives 2204 to a target constrained optimization problem and DPE 2208 may receive Hamiltonian functions associated with dynamic constraints 2205 to the target constrained optimization problem.

For example, for television broadcasting, the objectives may change in the sense that ads may be introduced either exclusively or alongside content which may necessitate the change to the objectives to accommodate a larger revenue in a given bandwidth. Likewise, the constraints may change. For instance, the size of each channel changes dynamically. For example, a video feed of a news reading may consume minimal bandwidth whereas a sports feed may consume a larger bandwidth.

In addition, digital processor 2202 provides the Hamiltonian functions associated with the dynamic objectives and constraints 2204, 2205 related to the target constrained optimization problem. Digital processor 2202 may be reprogrammed according to the new objectives and constraints received associated with the target constrained optimization problem. For example, the Hopfield network system 2200 may monitor in real time via an incoming data stream changes and updates to objectives and constraints 2204, 2205, accordingly. Notably, the Hopfield network system 2200 feeds the newly calculated problem instance (e.g., Hp(O')+Hp(C')) as the initial starting point for the incoming modifications to the target constrained optimization problem. Accordingly, this implementation of the present disclosure may employ adiabatic annealing to determine solutions to the modified instances (e.g., based on dynamic objectives and constraints) by starting from a previously determined solution.

A summation unit 2203 may accept as input the solution determined for a simple problem from DPEs 2206, objectives to a target constrained optimization problem, and constraints to a target constrained optimization problem after being passed through a timed gate 2210. Summation unit 2203 may also accept as input the solution determined for the dynamic objectives associated with the target constrained optimization problem received from DPE 2207 after being passed through a timed gate 2209. Lastly, summation unit 2203 may further accept as input the solution determined for the dynamic constraints associated with the target constrained optimization problem received from DPE 2208 after being passed through a timed gate 2211.

Figure 23:
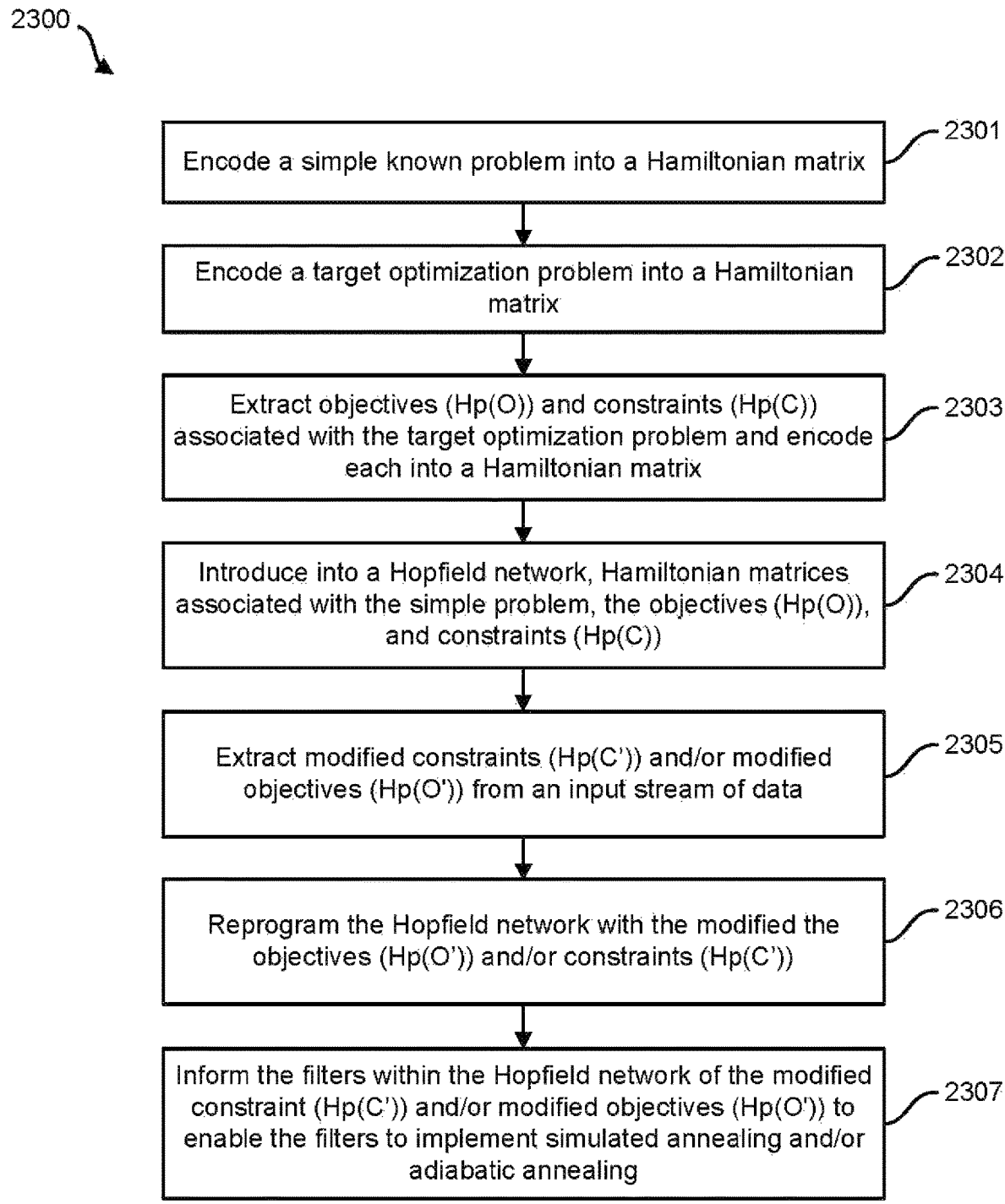
FIG. 23 is a flowchart of yet another method for determining a solution to a constrained optimization process.

FIG. 23 is a flowchart of yet another method 2300 for determining a solution to a constrained optimization process. The method 2300 may be implemented with the Hopfield network system 2200 illustrated in FIG. 22 and the Hopfield network system shown and described in reference to FIG. 2. Method 2300 begins with encoding a simple known problem into a Hopfield network Hamiltonian matrix (block 2301) and encoding a target constrained optimization problem into a Hopfield network Hamiltonian matrix (block 2302). In addition, the method includes extracting objectives (Hp(O)) and constraints (Hp(C)) of the target constrained optimization problem and encoding the objective and constraints into Hopfield network Hamiltonian matrices (block 2303).

Further, the method 2300 includes introducing into a Hopfield network, Hamiltonian matrices associated with the simple problem, the objectives (Hp(O)), and constraints (Hp(C)) (block 2304). Next, the method 2300 proceeds with extracting modified constraints (Hp(C')) and modified objectives (Hp(O')) from an input stream of data (block 2305) and reprogramming the memristor DPE system with the modified constraint (Hp(C')) and modified objectives (Hp(O')) Hopfield network Hamiltonian matrix (block 2306).

The method 2300 further includes informing the filters within the Hopfield network of the modified constraint (Hp(C')) and modified objectives (Hp(O')) to enable the filters to implement simulated annealing and/or adiabatic annealing. As such, the method depicted in method 2300 may employ adiabatic annealing, bit slicing, or simulated annealing to improve the Hopfield network system's 2200 (FIG. 22) ability to effectively and/or efficiently converge onto optimal solutions for target constrained optimization problems.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

The invention claimed is:

1. An accelerator device, comprising:
   a first memristor crossbar array having a plurality of non-volatile memory elements, each non-volatile memory element comprising a two-terminal memory element to generate a solution to an encoded matrix representation of a constrained optimization problem;
   a filtering unit to receive and filter solutions generated from the plurality of non-volatile memory elements; and
   a programming unit comprising dedicated hardware to write into the plurality of non-volatile memory elements an encoded matrix representation of a plurality of encoded matrix representations associated with the constrained optimization problem, in an iterative manner, upon each re-programming of the first memristor crossbar array,
      wherein the plurality of encoded matrix representations are ordered to increase in convergence to the encoded matrix representation of the constrained optimization problem,
      wherein the plurality of encoded matrix representations are each unique Hopfield network Hamiltonian functions associated with the constrained optimization problem, and
      wherein stochastic noise is injected during employment of a Hopfield network associated with the Hopfield network Hamiltonian functions that comprises a current pulse between 50 and 150 µA which is induced for about 5 µs to about 50 µs.

2. The accelerator device of claim 1, wherein the plurality of encoded matrix representations comprise a Hopfield network Hamiltonian function associated with the constrained optimization problem and the plurality of Hopfield network Hamiltonian functions that are each fractions of the Hopfield network Hamiltonian function associated with the constrained optimization problem.

3. The accelerator device of claim 1, wherein the plurality of non-volatile memory elements comprise at least one of nonlinear resistors, phase change memory, and spin torque-transfer random access memory.

4. The accelerator device of claim 1, wherein an initial encoded matrix representation of the plurality of encoded matrix representations associated with the constrained optimization problem is associated with an energy function having a single local minimum.

5. The accelerator device of claim 1, further comprising a solutions memory to store filtered solutions generated by the filtering unit.

6. The accelerator device of claim 5, further comprising a comparator to compare the filtered solutions stored in the solutions memory with a solution previously filtered from the filtering unit.

7. The accelerator device of claim 1, further comprising:
   a solutions memory; and
   a second memristor crossbar array coupled to the filtering unit and the solutions memory.

8. The accelerator device of claim 7, further comprising a weighting amplifier coupled to the first memristor crossbar array and the second memristor crossbar array, the weighting amplifier to generate a weighted sum of the solution received from the first memristor crossbar array and the second memristor crossbar array.

9. The accelerator device of claim 8, wherein the solutions memory to store solutions generated by the filtering unit and transmission lines that are coupled to the second memristor crossbar array wherein the transmission lines are to send the solutions generated by the filtering unit to the second memristor crossbar array.

10. The accelerator device of claim 1, wherein the programming unit comprises a digital-to-analog converter (DAC) to convert a digital representation of the plurality of encoded matrix representations into analog signals and an analog-to-digital converter (ADC) to convert an analog representation of the solution to the constrained optimization problem into digital signals.

11. The accelerator device of claim 1, wherein the programming unit further comprises dedicated hardware to write into the plurality of non-volatile memory elements a target constrained optimization problem, the target constrained optimization problem being unrelated to the constrained optimization problem.

12. A non-transitory computer readable medium comprising computer executable instructions stored thereon that, when executed by one or more processing units, causes the one or more processing units to:
   program a weights matrix of a Hopfield network with a first encoded matrix representation of an initial constrained optimization problem;
   employ the Hopfield network to determine a solution to the initial constrained optimization problem;
   encode a target constrained optimization problem into a second encoded matrix representation, the target constrained optimization problem being unrelated to the initial constrained optimization problem;
   encode a plurality of constrained optimization problems into a plurality of encoded matrix representations, each encoded matrix representation being a combination of the first encoded matrix representation and the second encoded matrix representation, the plurality of encoded matrix representations sequentially increasing in convergence to the second encoded matrix representation of the target constrained optimization problem; and
   re-program the weights matrix of the Hopfield network in an iterative manner with the plurality of encoded matrix representations, comprising:
      re-program the weights matrix of the Hopfield network with one of the plurality of encoded matrix representations in a sequential manner;
      inject stochastic noise that comprises a current pulse between 50 and 150 µA which is induced for about 5 µs to about 50 µs; and
      employ the Hopfield network to determine a solution to the encoded matrix representation presently programmed in the Hopfield network using the stochastic noise.

13. The non-transitory computer readable medium of claim 12, wherein the computer executable instructions, when executed by one or more processing units, further causes the one or more processing units to:
   bit slice the plurality of encoded matrix representations.

14. The non-transitory computer readable medium of claim 12, wherein the stochastic noise is injected during employment of the Hopfield network to determine the solution to the encoded matrix representation presently programmed in the Hopfield network.

15. The non-transitory computer readable medium of claim 14, wherein injecting the stochastic noise during employment of the Hopfield network comprises injecting a first level of stochastic noise followed by injecting a second level of stochastic noise that is lesser in degree than the first level of stochastic noise.

16. The non-transitory computer readable medium of claim 12, wherein the target constrained optimization problem is a non-deterministic polynomial-time hardness class of decision problems.

17. A method, comprising:
- encoding, by an accelerator device, an initial constrained optimization problem into a first encoded matrix representation;
- encoding a target constrained optimization problem into a second encoded matrix representation;
- generating a weighted sum of the first encoded matrix representation and the second encoded matrix representation;
- programming a weights matrix of a Hopfield network with the weighted sum of the first encoded matrix representation and the second encoded matrix representation; and
- employing, by the accelerator device, the Hopfield network to determine a solution to the target constrained optimization problem, wherein stochastic noise is injected while employing the Hopfield network that comprises a current pulse between 50 and 150 µA which is induced for about 5 µs to about 50 µs.

18. The method of claim 17, wherein generating the first encoded matrix representation of the initial constrained optimization problem comprises generating digital signals and converting the digital signals into analog signals.

19. The method of claim 17, wherein the weighted sum of the first encoded matrix representation and the second encoded matrix representation is generated by a weighting amplifier.

20. The method of claim 17, wherein the target constrained optimization problem is unrelated to the initial constrained optimization problem.

* * * * *